United States Patent
Bornitz et al.

(10) Patent No.: US 11,836,668 B2
(45) Date of Patent: Dec. 5, 2023

(54) SYSTEM AND METHOD OF PROVIDING INFORMED DELIVERY ITEMS USING A HYBRID-DIGITAL MAILBOX

(71) Applicant: United States Postal Service, Washington, DC (US)

(72) Inventors: Carrie Ann Bornitz, Sioux Falls, SD (US); Robert E. Dixon, Jr., Haymarket, VA (US); Ryan M. Luckay, Vienna, VA (US)

(73) Assignee: United States Postal Service, Washington, DC (US)

( * ) Notice: Subject to any disclaimer, the term of this patent is extended or adjusted under 35 U.S.C. 154(b) by 125 days.

(21) Appl. No.: 17/366,807

(22) Filed: Jul. 2, 2021

(65) Prior Publication Data
US 2021/0334747 A1    Oct. 28, 2021

Related U.S. Application Data

(63) Continuation of application No. 15/912,360, filed on Mar. 5, 2018, now Pat. No. 11,055,653.

(60) Provisional application No. 62/508,931, filed on May 19, 2017, provisional application No. 62/467,679, filed on Mar. 6, 2017.

(51) Int. Cl.
*G06Q 10/0833* (2023.01)
(52) U.S. Cl.
CPC ................. *G06Q 10/0833* (2013.01)
(58) Field of Classification Search
None
See application file for complete search history.

(56) References Cited

U.S. PATENT DOCUMENTS

| | | | |
|---|---|---|---|
| 5,363,971 A * | 11/1994 | Weeks | B07C 3/06 209/584 |
| 5,586,036 A | 12/1996 | Pintsov | |
| 5,682,429 A | 10/1997 | Cordery et al. | |
| 6,173,274 B1 * | 1/2001 | Ryan, Jr. | G07B 17/0008 705/401 |
| 6,178,411 B1 * | 1/2001 | Reiter | G06Q 30/02 705/410 |
| 6,826,548 B2 * | 11/2004 | Hungerpiller | G06Q 10/107 705/401 |
| 6,959,292 B1 * | 10/2005 | Pintsov | G06Q 50/06 705/62 |
| 7,190,474 B1 * | 3/2007 | Silverbrook | H04N 1/00567 358/1.14 |
| 7,258,277 B2 * | 8/2007 | Baker | B07C 3/14 235/487 |

(Continued)

OTHER PUBLICATIONS

Balaji, "Destination Address Interpretation for Automating the Sorting Process of Indian Postal System", published by IEEE, in 2003 (Year: 2003).*

(Continued)

*Primary Examiner* — Omar Zeroual
(74) *Attorney, Agent, or Firm* — Knobbe Martens Olson & Bear LLP

(57) ABSTRACT

Systems and methods of creating, managing, and distributing supplemental content associated with items in a distribution network. A physical delivery item can be imaged and associated with additional content generated or associated with the sender of the physical delivery item.

10 Claims, 6 Drawing Sheets

(56) References Cited

U.S. PATENT DOCUMENTS

| | | | | |
|---|---|---|---|---|
| 7,571,211 B1* | 8/2009 | Melick | | H04L 67/52 |
| | | | | 379/88.13 |
| 7,693,942 B2* | 4/2010 | Nale | | H04L 51/48 |
| | | | | 709/202 |
| 7,827,056 B2* | 11/2010 | Walker | | G06Q 20/387 |
| | | | | 705/14.1 |
| 7,827,057 B1* | 11/2010 | Walker | | G06Q 30/0234 |
| | | | | 705/14.1 |
| 8,041,711 B2* | 10/2011 | Walker | | G06Q 30/0277 |
| | | | | 707/726 |
| 8,190,496 B2* | 5/2012 | Rodriguez | | G06Q 30/0635 |
| | | | | 705/26.81 |
| 8,526,743 B1* | 9/2013 | Campbell | | H04N 23/80 |
| | | | | 382/218 |
| 8,598,482 B2* | 12/2013 | Bonnell | | G06Q 50/32 |
| | | | | 700/223 |
| 8,619,955 B2* | 12/2013 | Gopalakrishnan | | H04L 67/52 |
| | | | | 705/14.57 |
| 8,666,806 B2* | 3/2014 | Rojas | | G06Q 50/32 |
| | | | | 705/14.4 |
| 8,973,066 B2 | 3/2015 | Hilson et al. | | |
| 9,105,016 B2* | 8/2015 | Briggman | | G06Q 10/0833 |
| 9,159,071 B2* | 10/2015 | Gordon | | H04L 9/3247 |
| 10,354,216 B2* | 7/2019 | Gillen | | G06Q 10/0835 |
| 10,387,824 B2* | 8/2019 | Gillen | | G06Q 10/0835 |
| 10,417,669 B2* | 9/2019 | Ho | | G09F 23/00 |
| 10,510,084 B2* | 12/2019 | Dearing | | G06Q 30/02 |
| 10,607,179 B1* | 3/2020 | Lee | | G06Q 10/08355 |
| 10,693,819 B1 | 6/2020 | Boyd et al. | | |
| 11,499,835 B1 | 11/2022 | Lauka et al. | | |
| 2002/0032602 A1* | 3/2002 | Lanzillo, Jr. | | G06Q 30/06 |
| | | | | 705/14.66 |
| 2002/0082923 A1* | 6/2002 | Merriman | | G06Q 30/0253 |
| | | | | 705/14.51 |
| 2002/0095306 A1* | 7/2002 | Smith | | G06Q 10/0833 |
| | | | | 705/333 |
| 2002/0143880 A1* | 10/2002 | Sansone | | H04L 51/066 |
| | | | | 709/206 |
| 2003/0074411 A1* | 4/2003 | Nale | | H04N 1/00127 |
| | | | | 709/206 |
| 2003/0169900 A1* | 9/2003 | Woolston | | G07B 17/00024 |
| | | | | 382/101 |
| 2004/0178128 A1* | 9/2004 | O'Connell | | B07C 3/00 |
| | | | | 209/584 |
| 2004/0181462 A1* | 9/2004 | Bauer | | G06Q 10/107 |
| | | | | 705/26.1 |
| 2005/0174592 A1* | 8/2005 | Iinuma | | H04N 1/00209 |
| | | | | 358/1.15 |
| 2005/0175215 A1* | 8/2005 | Machida | | G06F 21/31 |
| | | | | 382/100 |
| 2005/0204381 A1* | 9/2005 | Ludvig | | H04N 21/6125 |
| | | | | 725/35 |
| 2005/0222903 A1* | 10/2005 | Buchheit | | G06Q 30/02 |
| | | | | 705/14.54 |
| 2005/0278142 A1* | 12/2005 | Beckert | | G01N 1/2273 |
| | | | | 702/181 |
| 2006/0229895 A1 | 10/2006 | Kodger, Jr. | | |
| 2006/0230004 A1* | 10/2006 | Handley | | G06F 40/258 |
| | | | | 706/12 |
| 2006/0253405 A1* | 11/2006 | Nirenberg | | G06Q 50/32 |
| | | | | 705/401 |
| 2007/0007341 A1* | 1/2007 | Poulin | | G07C 13/00 |
| | | | | 235/386 |
| 2007/0088749 A1* | 4/2007 | Lorch | | H04L 63/029 |
| 2007/0156422 A1* | 7/2007 | Foth | | G06Q 10/0835 |
| | | | | 705/336 |
| 2007/0156423 A1* | 7/2007 | Foth | | G06Q 10/0832 |
| | | | | 705/332 |
| 2007/0216960 A1* | 9/2007 | Ohtani | | H04N 1/32122 |
| | | | | 358/407 |
| 2008/0019562 A1* | 1/2008 | Makishima | | H04N 1/00222 |
| | | | | 382/101 |
| 2008/0065490 A1* | 3/2008 | Novick | | G06Q 30/0225 |
| | | | | 705/14.39 |
| 2008/0071558 A1* | 3/2008 | Crutchfield | | G06Q 10/08 |
| | | | | 705/333 |
| 2008/0104191 A1* | 5/2008 | Agrawal | | G07B 17/00024 |
| | | | | 709/201 |
| 2008/0154751 A1* | 6/2008 | Miles | | G06Q 10/06 |
| | | | | 705/28 |
| 2008/0158615 A1* | 7/2008 | Parkos | | H04N 1/00127 |
| | | | | 358/402 |
| 2008/0246990 A1 | 10/2008 | Brockhurst | | |
| 2009/0051108 A1* | 2/2009 | Bell | | B65H 7/125 |
| | | | | 271/264 |
| 2009/0157733 A1* | 6/2009 | Kim | | G06F 16/217 |
| | | | | 707/999.102 |
| 2009/0187939 A1* | 7/2009 | Lajoie | | H04N 7/17318 |
| | | | | 725/87 |
| 2009/0190192 A1* | 7/2009 | Kohara | | H04N 1/40068 |
| | | | | 358/448 |
| 2009/0213405 A1* | 8/2009 | Eguchi | | G06Q 30/00 |
| | | | | 358/1.15 |
| 2009/0228380 A1* | 9/2009 | Evanitsky | | G06Q 40/123 |
| | | | | 705/31 |
| 2009/0313194 A1* | 12/2009 | Amar | | G06F 16/353 |
| | | | | 706/20 |
| 2010/0049536 A1* | 2/2010 | Quine | | G06Q 30/04 |
| | | | | 229/301 |
| 2010/0100233 A1* | 4/2010 | Lu | | B07C 3/18 |
| | | | | 700/226 |
| 2010/0153252 A1* | 6/2010 | Begen | | G06Q 10/10 |
| | | | | 705/302 |
| 2010/0161424 A1* | 6/2010 | Sylvain | | G06Q 30/02 |
| | | | | 705/14.66 |
| 2010/0228595 A1* | 9/2010 | Dempster | | G06Q 30/0255 |
| | | | | 705/14.49 |
| 2010/0230328 A1* | 9/2010 | Bonnell | | G06Q 10/083 |
| | | | | 707/E17.014 |
| 2010/0287282 A1* | 11/2010 | MacLaughlin | | G06Q 50/01 |
| | | | | 709/226 |
| 2011/0066692 A1* | 3/2011 | Ciancio-Bunch | | G06Q 30/02 |
| | | | | 709/206 |
| 2011/0071894 A1* | 3/2011 | Nesamoney | | G06Q 30/0269 |
| | | | | 705/14.66 |
| 2011/0093347 A1* | 4/2011 | Lindblom | | G06Q 30/02 |
| | | | | 709/206 |
| 2011/0145329 A1* | 6/2011 | Fukasawa | | H04N 1/00464 |
| | | | | 709/203 |
| 2011/0173114 A1 | 7/2011 | Annunziata | | |
| 2011/0258039 A1* | 10/2011 | Patwa | | G06Q 30/00 |
| | | | | 705/14.45 |
| 2011/0264530 A1* | 10/2011 | Santangelo | | H04L 67/53 |
| | | | | 370/352 |
| 2011/0302025 A1* | 12/2011 | Hsiao | | G06Q 30/0242 |
| | | | | 705/14.42 |
| 2012/0042025 A1* | 2/2012 | Jamison | | G06Q 30/0242 |
| | | | | 709/206 |
| 2012/0054143 A1* | 3/2012 | Doig | | G06Q 30/0243 |
| | | | | 706/47 |
| 2012/0054189 A1* | 3/2012 | Moonka | | G06Q 30/02 |
| | | | | 707/E17.09 |
| 2012/0059714 A1* | 3/2012 | Furman | | G06Q 30/0251 |
| | | | | 705/14.69 |
| 2012/0072280 A1* | 3/2012 | Lin | | G06Q 30/0246 |
| | | | | 705/14.45 |
| 2012/0182588 A1* | 7/2012 | Mampe | | G07B 17/0008 |
| | | | | 382/101 |
| 2013/0035985 A1* | 2/2013 | Gilbert | | G06Q 30/0202 |
| | | | | 705/7.31 |
| 2013/0041961 A1* | 2/2013 | Thrower, III | | H04L 51/52 |
| | | | | 709/206 |
| 2013/0054371 A1* | 2/2013 | Mason | | G06Q 30/0256 |
| | | | | 705/14.64 |
| 2013/0198300 A1* | 8/2013 | Briggman | | G06Q 10/1093 |
| | | | | 709/206 |
| 2013/0212034 A1 | 8/2013 | Briggman et al. | | |

(56) References Cited

U.S. PATENT DOCUMENTS

| | | | |
|---|---|---|---|
| 2013/0254815 A1* | 9/2013 | Pfeffer | H04N 21/25891 725/96 |
| 2014/0105452 A1* | 4/2014 | Bowne | G06V 10/94 382/101 |
| 2014/0123176 A1* | 5/2014 | Cooper | H04N 21/2668 725/34 |
| 2014/0136632 A1* | 5/2014 | Rauh | H04L 51/214 709/206 |
| 2014/0140571 A1* | 5/2014 | Elmenhurst | G06T 7/60 382/101 |
| 2014/0200972 A1* | 7/2014 | Jeremias | G06Q 10/107 705/14.7 |
| 2014/0278851 A1 | 9/2014 | Kopanati | |
| 2014/0316902 A1* | 10/2014 | Le Jouan | G06Q 30/0257 705/14.66 |
| 2014/0333958 A1* | 11/2014 | Oshima | H04N 1/32797 358/1.15 |
| 2014/0351163 A1* | 11/2014 | Tussy | G06Q 10/083 705/330 |
| 2014/0374478 A1 | 12/2014 | Dearing et al. | |
| 2015/0039528 A1* | 2/2015 | Minogue | G06Q 10/0832 705/332 |
| 2015/0149274 A1* | 5/2015 | Conrad | G06Q 30/0261 705/14.54 |
| 2016/0224938 A1* | 8/2016 | Shah | G06Q 10/083 |
| 2017/0024767 A1* | 1/2017 | Johnson, Jr. | G06Q 30/0261 |
| 2017/0147588 A1* | 5/2017 | Maller | G06F 16/125 |
| 2017/0195268 A1* | 7/2017 | Nair | H04L 51/066 |
| 2018/0089526 A1* | 3/2018 | Walsh | G06Q 10/0838 |
| 2018/0089623 A1* | 3/2018 | Walsh | G06V 30/416 |
| 2018/0121873 A1 | 5/2018 | Walsh | |
| 2018/0165715 A1* | 6/2018 | Pingry | G06Q 30/0267 |
| 2018/0189831 A1* | 7/2018 | Appel | G06Q 30/0255 |
| 2018/0253687 A1 | 9/2018 | Bornitz et al. | |
| 2019/0122174 A1 | 4/2019 | Gil | |
| 2019/0132458 A1* | 5/2019 | Okuno | H04N 1/00503 |
| 2019/0188544 A1 | 6/2019 | Cousins et al. | |
| 2021/0117573 A1 | 4/2021 | Lewbel et al. | |
| 2021/0224766 A1* | 7/2021 | Kuncl | G06Q 30/0601 |

OTHER PUBLICATIONS

Is Balaji, "Destination Address Interpretation for Automating the Sorting Process of Indian Postal System", published by IEEE, in 2003 (Year: 2003).*

Haidong Yuan, "Image-based Stamp Extraction for Enhanced Postal Automation", published by IEEE, in 2008 (Year: 2008).*

* cited by examiner

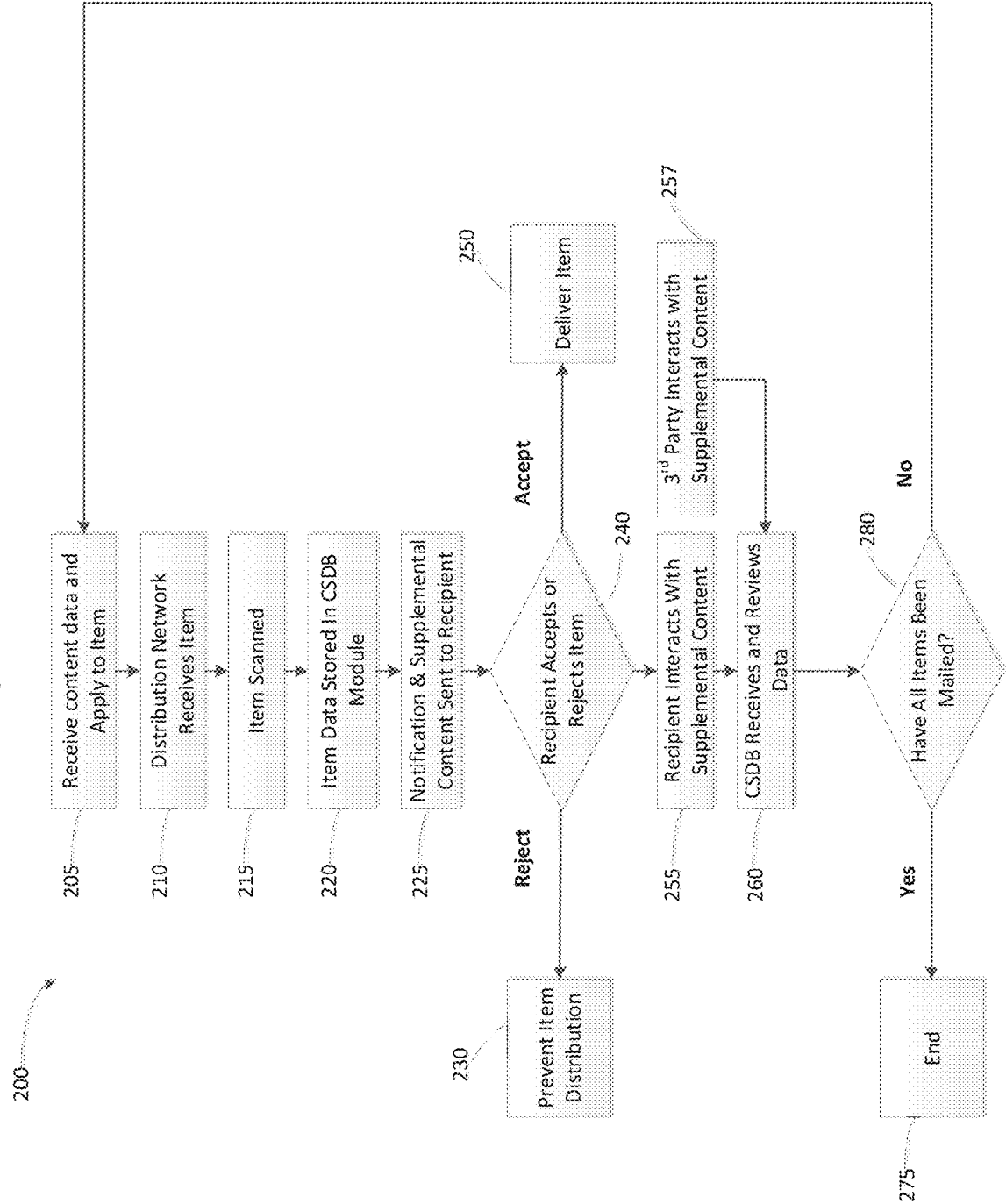

form, an example
SYSTEM AND METHOD OF PROVIDING INFORMED DELIVERY ITEMS USING A HYBRID-DIGITAL MAILBOX

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a Continuation application of U.S. application Ser. No. 15/912,360, filed Mar. 5, 2018, which claims the benefit of priority to U.S. provisional application Nos. 62/467,679 and 62/508,931, filed Mar. 6, 2017 and May 19, 2017 respectively, the entire contents of which are hereby incorporated by reference.

BACKGROUND

Recent advancements in the field of digital communications have resulted in a wide variety of alternative paths by which a user can receive information. In particular, advancements in electronic mail services and instant messaging services have diverted traffic away from traditional physical mail channels, as instantaneous communications have permanently changed the perceptions and behaviors of users with respect to communication. In 2010, broadband Internet penetration reached 80% and wireless web penetration reached 96% penetration. With the Internet's accessibility at such heights, users are increasingly turning to its convenience to manage all aspects of communications, financial transactions, and commerce.

Because of the increased importance of electronic communications, and because physical mail plays an important role, it is desirable to enhance physical mail by providing novel digital features to the physical mail experience.

BRIEF DESCRIPTION OF THE DRAWINGS

Enabling digital advertising to mail item recipients, as well as other objects, may be achieved by systems and methods for creating, managing, and distributing supplement content, in addition to distributing physical mail items, according to embodiments of the disclosure as described herein.

Reference will now be made to the accompanying drawings showing example embodiments of this disclosure in the drawings.

FIG. 2A is a flow diagram depicting a process for managing supplemental content in accordance with an example embodiment.

SUMMARY

Figure 1A:
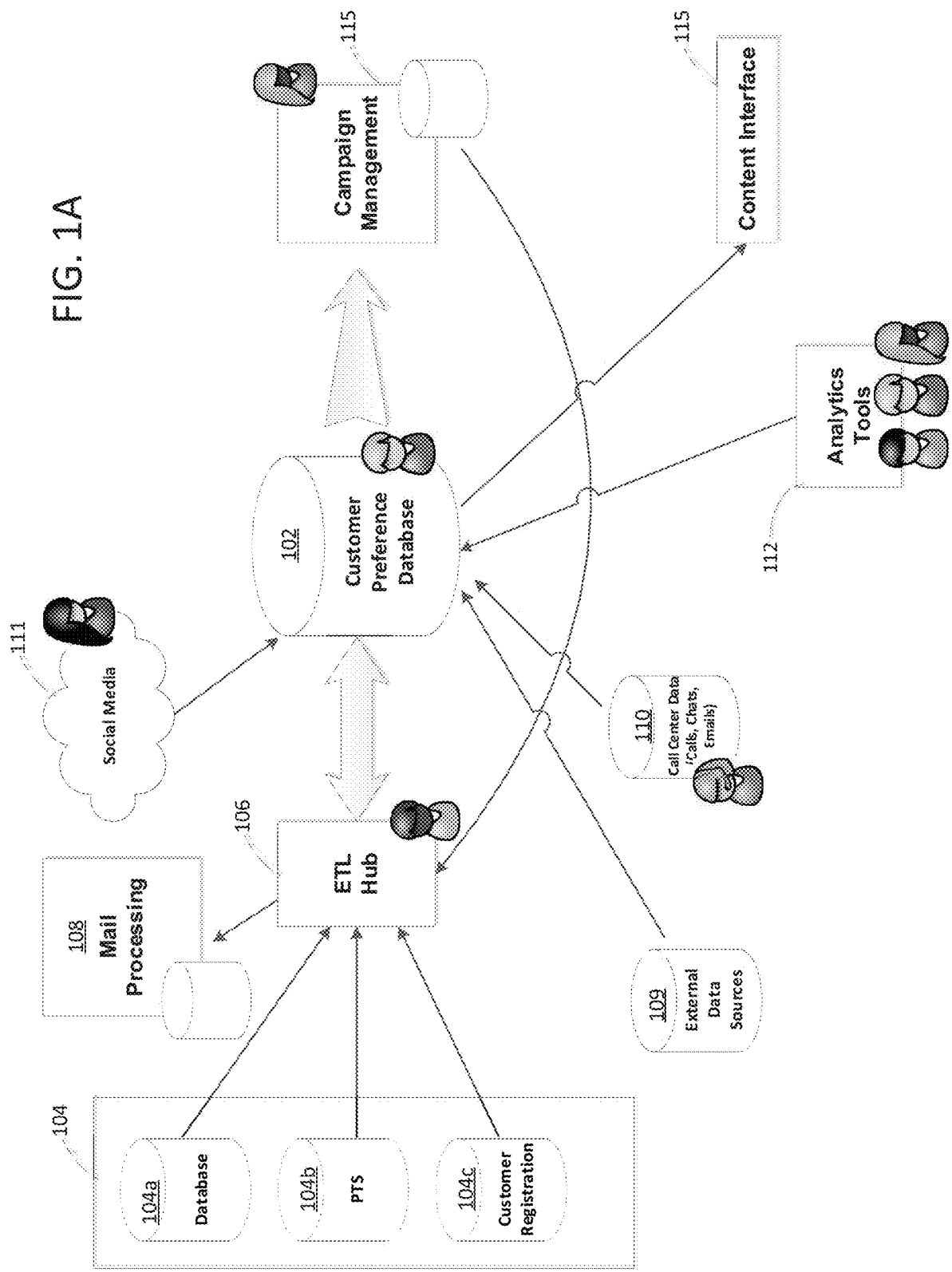
FIG. 1A depicts a diagram of various inputs available for generating a customer preference database.

In one aspect described herein, a system for handling distribution items comprises item processing equipment comprising an imaging device, the imaging device configured to image a physical distribution item and interpret an identifier on the physical distribution item, and to generate scan information which includes the identifier; an item image server configured to store the image of the physical distribution item and to associate the identifier with the stored image; a supplemental item content interface in communication with a supplemental item content server, the supplemental item content server configured to receive supplemental item content and to associate the supplemental item content with the identifier; and a central hub in communication with the mail image server and the supplemental item content server, the central hub configured to track delivery data for the physical distribution item having the identifier thereon; provide to the recipient of the physical distribution item the delivery notification including the stored image of the physical distribution item; provide, to the recipient, the supplemental item content with the delivery notification; and receive, from the recipient, interaction information regarding the recipient's interaction with the supplemental item content and store the interaction information.

In some embodiments, the supplemental item content is embedded in the provided image of the physical distribution item.

In some embodiments, the delivery notification and the supplemental item content are provided via a recipient interface.

In some embodiments, the recipient interface is configured to provide an option to accept or reject the physical distribution item.

In some embodiments, the supplemental item content comprises a link provided by a generator of the supplemental item content.

In some embodiments, the supplemental item content interface is configured to receive the interaction information and to provide the interaction information to a generator of the supplemental item content.

In some embodiments, the system further comprises a customer preference database, the customer preference database storing preference data for a plurality of customers.

In some embodiments, the supplemental item content interface is configured to receive a request for a distribution list of recipients and a list of preference parameters.

In some embodiments, the customer preference database is configured to generate a list distribution list of a plurality recipients based on the preference parameters, and to generate a unique identifier for each of the plurality of recipients.

In some embodiments, the central processor is configured to track the delivery data for the physical distribution item based on the scan information from the mail processing equipment, and to provide the supplemental item content when the identifier in the scan information is associated with supplemental item content in the supplemental item content server.

In another aspect described herein, a method for handling distribution items comprises imaging, in mail processing equipment a physical distribution item; interpreting an identifier on the physical distribution item; generating image information which includes the identifier; storing the image of the physical distribution item; associating the identifier with the stored image; receiving, via a supplemental content interface, supplemental item content; associating the supplemental item content with the identifier; tracking delivery data for the physical distribution item having the identifier thereon; providing, to a recipient of the physical distribution item, a delivery notification including the stored image of the physical distribution item; providing, to the recipient, the supplemental item content with the delivery notification; and receiving, from the recipient, interaction information regarding the recipient's interaction with the supplemental item content.

In some embodiments, the supplemental item content is embedded in the provided image of the physical distribution item.

In some embodiments, providing the delivery notification and the supplemental item content comprise providing the delivery notification and the supplemental item content via a recipient interface.

In some embodiments, the method further comprises providing, via the recipient interface, an option to accept or reject the physical distribution item.

In some embodiments, the supplemental content comprises a link provided by a mailer In some embodiments, the method further comprises providing, via the supplemental item content server, the interaction information to a generator of the supplemental content.

In some embodiments, the method further comprises storing, in a customer preference database, customer preference data for a plurality of customers.

In some embodiments, the method further comprises receiving, via the supplemental content interface, a request for a distribution list of recipients and a list of preference parameters.

In some embodiments, the method further comprises generating a distribution list including a plurality recipients for the physical distribution item based on the received preference parameters.

In another aspect, the present disclosure describes a method for creating, managing, and distributing supplement content associated with items in a distribution network may include receiving tracking data regarding a delivery item. In some embodiments, the method further includes receiving supplemental content and associating the supplemental content with a delivery item. The method may also include automatically scheduling delivery of the supplemental content after the supplemental content is associated with the delivery item. The method may additionally include receiving tracking data regarding recipient interaction with the supplemental content. The method may further include automatically altering supplemental content based on the recipient interaction data.

In another aspect, an electronic device is provided. The electronic device includes a computer readable storage medium that stores instructions. The electronic device further includes a processor for executing the instructions to perform a method. The method may include receiving tracking data regarding a delivery item. The method further includes receiving supplemental content and associating the supplemental content with a delivery item. The method may also include automatically scheduling delivery of the supplemental content after the supplemental content is associated with the delivery item. The method may additionally include receiving tracking data regarding recipient interaction with the supplemental content. The method may further include automatically altering supplemental content based on the recipient interaction data.

In another example embodiment, a computer readable storage medium is provided. The computer-readable storage medium stores instructions that, when executed by a processor, performs a method. The method may include receiving tracking data regarding a delivery item. The method further includes receiving supplemental content and associating the supplemental content with a delivery item. The method may also include automatically scheduling delivery of the supplemental content after the supplemental content is associated with the delivery item. The method may additionally include receiving tracking data regarding recipient interaction with the supplemental content. The method may further include automatically altering supplemental content based on the recipient interaction data.

DETAILED DESCRIPTION

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The present disclosure relates to systems and methods for real-time creation, management, and distribution of supplemental content associated with items in a distribution network such as the United States Postal Service (USPS). This may include providing real-time tracking capability of each piece of enhanced digital content associated with an item in a distribution network.

In order to provide the capabilities described herein, tracking data, including real-time tracking data can be stored. In a distribution network with many items, the storage capability must be large in order to receive, store, and provide access to the stored tracking data. In some embodiments, the system includes a central data storage repository in communication with a powerful analytical engine with real-time processing capabilities.

A distribution network may comprise multiple levels. For example, a distribution network may comprise regional distribution facilities, hubs, and unit delivery facilities, or any other desired level. A nationwide distribution network, for example, may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the USPS, the unit delivery facility may be associated with a ZIP Code. The unit delivery facility receives items from local senders, and from hub level facilities or regional distribution facilities. The unit delivery facility also sorts and stages the items intended for delivery to destinations within the unit delivery facility's coverage area.

As used herein, the term item may refer to an individual article, object, agglomeration of articles, or container having more than one article within, in a distribution system. The item may be a letter, magazine, flat, luggage, package, box, or any other item of inventory which is transported or delivered in a distribution system or network. The term item may also refer to a unit or object which is configured to hold one or more individual items, such as a container which holds multiple letters, magazines, boxes, etc. The term item may also include any object, container, storage area, rack, tray, truck, train car, airplane, or other similar device into which items or articles may be inserted and subsequently transported, as are commonly used in distribution systems and networks.

The term item recipient is used to describe embodiments of the present development. This term is exemplary only, and the scope of the present disclosure is not limited to the potential recipient of an item.

The term supplemental content and others terms are used to describe embodiments of the present development. As used herein, supplemental content can refer to digital coupons, graphics, videos, emails, webpages, hyperlinks, text messages, instant messages, social media messages, text, augmented reality interfaces, and the like. These terms are exemplary only, and the scope of the present disclosure is not limited thereto.

The term advertising campaign and others terms are used to describe embodiments of the present development. As used herein, an advertising campaign can refer to an association of one or more pieces of supplemental content with a recipient list, a budget, and a campaign duration. These terms are exemplary only, and the scope of the present disclosure is not limited thereto.

As an example illustrating enhanced digital content provided with mailpieces, a health food store manager may want to advertise that their health food store is having a sale on organic produce. In addition to sending out direct advertisement mailers, the health food advertiser can enhance the physical mailpiece with content provided and delivered via the supplemental content system. The health food store begins by creating an advertising campaign using an interface associated with the supplemental content system. The advertising campaign associates a digital advertisement, provided by the health food advertiser, with mail items scheduled to be delivered to recipients via USPS. The mail item can be can be a mailpiece generated by or on behalf of the health food store. Once a mail item is inducted into the mail stream, or is scanned at the local delivery unit for delivery, or at another point during the mailpiece's transit through the mail distribution network, the item's recipient will receive an email containing detailed mail item data such as shipping date, scheduled delivery date, dimensions, sender identification, and an image of items or mailpieces which are scheduled for delivery to that recipient for a given time period, such as a day, two days, three days, a week, and the like The images are generally obtained from the mail processing equipment. Systems for providing digital information regarding mailpieces can be similar to those described in U.S. patent application Ser. No. 13/619,074, filed on Sep. 14, 2012, now U.S. Pat. No. 9,105,016, which is incorporated by reference in its entirety. The images of the item sent by or on behalf of the health food store can include additional information embedded within or linked to the image of the mail item. In this example, the supplemental content is a hyperlink to a coupon page on the health food store's website. The email may additionally include an interface or a link to an interface where a recipient can interact with the enhanced digital content, and can, for example, affirmatively accept the mail item, rejecting the mail item, rescheduling the mail item, changing the shipping address of the mail item, or add or change delivery preferences or properties.

The supplemental content system also tracks recipient interactions with the supplemental content. In this example, the USPS gathers, records, stores, and/or communicates to the health food advertiser data each time a mail item recipient clicks on the enhanced digital content hyperlink, and can charge a fee for the service, such as a per click fee. In some embodiments, the USPS can provide the recipient interaction data in a variety of other ways. In some embodiments, the supplemental content system can automatically alter the advertising campaign, such as offers, timing, details, etc., based on the identity of the recipient, the geographical area in which the recipient is located, and/or the recipient interaction data. For example, if the health food store is a national chain, the supplemental content, or enhanced digital content, may be customized to the local geographic region in which the recipient is located. The USPS may also use gathered information regarding a recipient's purchases, subscriptions, identity of individuals or companies that send items to the recipient, and the like to provide customized supplemental content. In some embodiments, the recipient information is not provided to the health food store, but is provided via the supplemental content system in anonymized or other similar fashion. The health food store may provide one, two, three, or more different versions of supplemental content geared toward various income levels, shopping habits, etc., and provide the versions to the supplemental content system. The USPS can then link to or provide the version of supplemental content to each recipient of a mailpiece, where the supplemental content corresponds to the needs, interests, preferences, etc. of each specific recipient. In some embodiments, the supplemental content system may determine that supplemental content recipients click on a supplemental content hyperlink less often when the hyperlink font color is red. Based on this inference, the supplemental content system could then change the hyperlink to another color such as blue. Other advertising campaign changes may include altering the supplemental content recipient list, altering the supplemental content text, altering the supplemental content images, altering the campaign budget, and the like.

FIG. 1A depicts inputs into a customer preference database (CPDB) 102, which can be used in systems and methods described herein. The CPDB 102 can gather and store information regarding preferences and preference information for users, senders, shippers, recipients, and customers of a distribution network. The CPDB 102 can gather this information passively from other information sources, can gather preference information based on an opt-in system, or can proactively request and obtain preference information from customers, and advantageously recipients of mail items.

The information or records in the CPDB can be based on core records such as information from customer data 104. The customer data 104 can be obtained from several sources within the distribution network, such as the USPS. The customer data 104 can include a recipient database 104*a*, a product tracking system (PTS) 104*b*, and a customer registration database 104*c*. The recipient database 104*a* can be a stored list of all the recipients and addresses of recipients of items delivered by the distribution network. For example, this can be a list of names and addresses of people and businesses to which the USPS delivers.

PTS 104*b* includes product tracking information, including the types and frequency of items, such as packages, parcels, flats, magazines, and other items which are delivered to recipients in distribution network. PTS 104*b* can store information about which recipients receive which types of items and the frequency thereof.

The customer registration database 104*c* includes information, including preferences, subscriptions, payments, etc. for all customers, such as recipients, users, etc., that have been provided to the distribution network across various platforms, such as via a mobile application, via a website, via a change of address request, or any other interaction with the distribution network where a recipient provided information. This information can be stored in the customer registration database 104*c* on an opt-in or opt-out basis.

The information from the customer data 104 can be aggregated and combined in a ETL hub 106. The ETL hub 106 can take the various records from the customer data 104 and aggregate the information for storage using expand, transform, load database techniques, or any other desired techniques. The ELT hub 106 can be guided by sets of aggregation rules which direct how the customer data 104 should be aggregated. The aggregation rules may vary based on the intended application, or campaign. The ETL hub 106 provides the aggregated customer data to the CPDB 102 for storage. The ETL hub 106 can provide different sets of aggregated data for use in different applications or campaigns.

The ETL hub 106 can interface with mail processing equipment 108 to instruct regarding delivery instructions, processing and sorting instructions, routing instructions and the like. The ETL hub 106 may receive the processing instructions from the CPDB 102.

The CPDB 102 core records obtained from the customer data 104 may be supplemented with data from external data sources 109, customer service data 110, and social media 111. External data sources 109 may be obtained from a third-party and may be used for one or more campaigns. In some embodiments, customer or user data form the external data sources 109 may expire and may be removed after use. Customer service data 110 may be obtained from customers who interact with the distribution network, such as via a call center, online help, in-person transactions at distribution facility, such as a post office or retail location, and the like. Social media information 111 can be obtained from various social media sources and can supplement the records in the CPDB 102. The social media information 111 can include social media comments regarding product preferences, feelings about products and services, and the like. These preferences can be added to a user's profile in the CPDB 102.

An analytics tools engine 112 can access the customer data and profiles in the CPDB 102 and evaluate the data and profiles to determine potential new product offerings for the distribution network and customers of the distribution network. The analytics tools engine 112 can also analyze the customer profiles in the CPDB 102 to determine target recipients for particular campaigns or supplemental content, as will be described in greater detail below. The analytics tool engine 112 also analyzes historical campaign effectiveness data, an can use the historical data to shape future campaigns, and/or can provide the data to an advertiser, shipper, and the like.

The CPDB 102 is in communication with a content interface 125. The content interface 125 can be provided as webtools for a shipper to query a batch of barcodes for sending a physical mail piece to a group of recipients for a particular physical distribution item. The content interface 125 can query the CPDB 102 for recipients for a particular mailpiece or campaign. The CPDB 102 can use the requirements from the content interface 125 and using the analytics tool engine 112 can prepare a list of recipients or potential recipients for the sender or advertiser. The CPDB 101 may not provide the names and addresses of the identified recipients, but may provide a batch of barcodes which the shipper or advertiser can place on the physical distribution items. The barcodes will be associated with the delivery points of the identified recipients, and the barcodes can be recognized by the mail processing equipment 108. More details regarding the content interface 125 will be provided elsewhere herein.

A campaign management module 113 extracts data from the CPDB 102 for execution of specific campaigns. Response data is received from various components of the distribution network (as will be described in greater detail below) during campaign execution. The response data from the campaigns can be received and stored in the CPDB 102. Customer profiles for customers who interact with supplemental content and/or make purchases for a campaign can be updated with the interaction and purchase data.

Figure 1B:
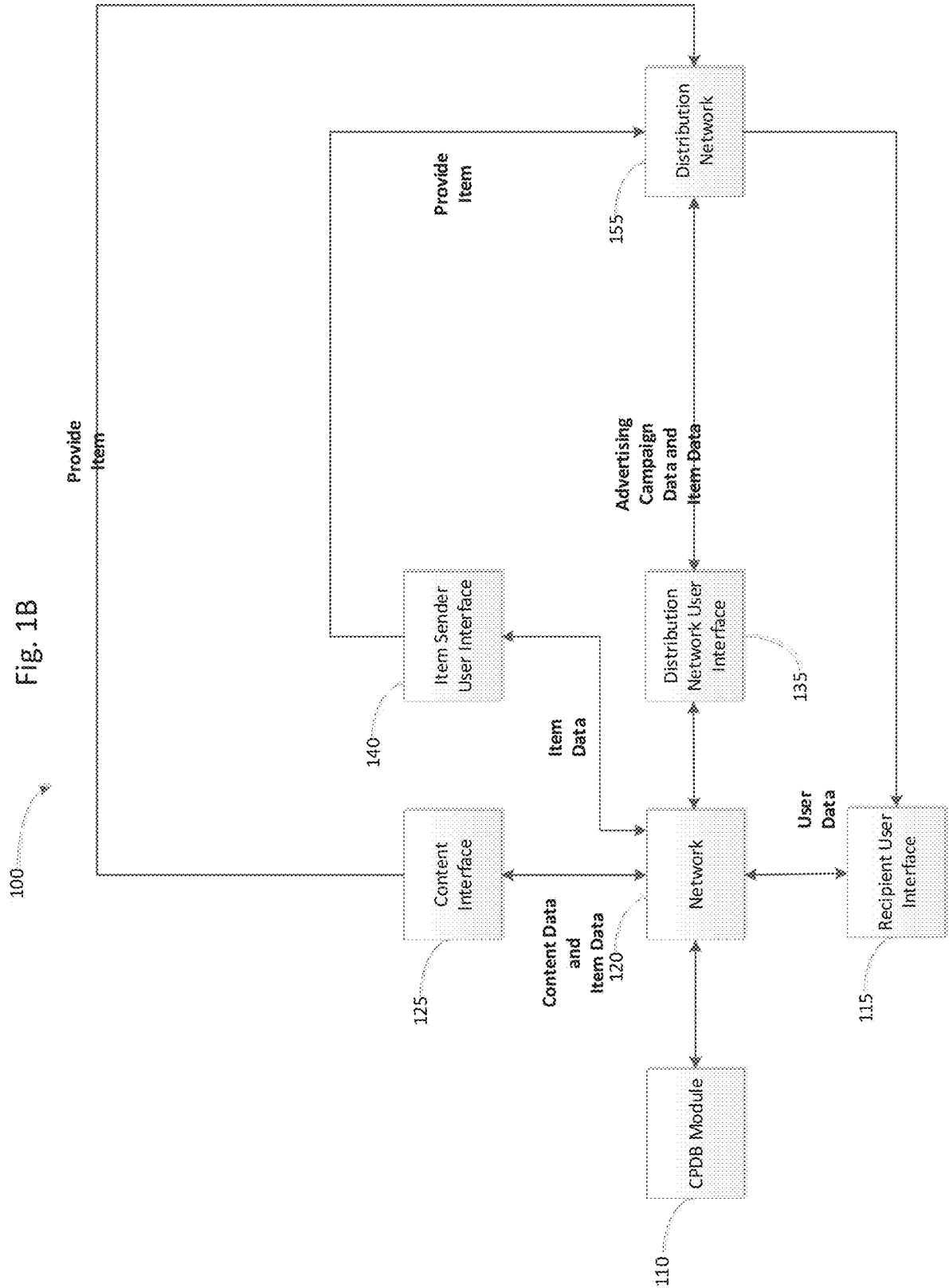
FIG. 1B shows, in block diagram form, an example system for managing supplemental content.

FIG. 1B depicts one embodiment of a system 100 for real-time creation and routing of enhanced digital content. A system 100 comprises the customer service database or a customer preference database (CPDB) module 110, a distribution network 155, and an content interface 125. In some embodiments, the system 100 may additionally comprise an item sender user interface 140, a distribution network user interface 135, and a recipient user interface 115. The CPDB module 110 can be a central hub for the system 100, and is in communication, either wired or wirelessly, with the item sender user interface 140, the distribution network user interface 135, the content interface 125, and the recipient user interface 115. In some embodiments, the interfaces described herein may be a graphical user interface, a computer, a processor, a combination of the two, or other similar device in communication with the CPDB module 110. In some embodiments, the item sender user interface 140, the distribution network user interface 135, the content interface 125, and the recipient user interface 115 may be in communication either wired or wirelessly, with the distribution network 155.

The CPDB module 110 may comprise or be a component of a processing system implemented with one or more processors. The CPDB module 110 may be a network of interconnected processors housed in one or more terminals. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The CPDB module 110 may comprise a processor such as, for example, a microprocessor, such as a Pentium® processor, a Pentium® Pro processor, a 8051 processor, a MIPS® processor, a Power PC® processor, an Alpha® processor, a microcontroller, or the like. The processor typically has conventional address lines, conventional data lines, and one or more conventional control lines. The CPDB module 110 is in communication with a memory, which may include, for example, RAM memory, flash memory, ROM memory, EPROM memory, EEPROM memory, registers, hard disk, a removable disk, a CD-ROM, or any other form of storage medium known in the art. The memory may include, for example, software, at least one software module, instructions, steps of an algorithm, or any other information. In some embodiments, the processor performs processes in accordance with instruction stored in the memory. These processes may include, for example, controlling features and/or components of the system 100, and controlling access to and from the CPDB module 110, and transmitting information and data to and from the CPDB module 110 and the constituent components of the system 100, as will be described herein. The CPDB module 110 is configured to coordinate and direct the activities of the other components of the system 100.

The CPDB module 110 is often in communication, either wired or wireless, with components of the distribution network 155. The CPDB module 110 communicates item data, advertising campaign data, item recipient data, and supplemental content recipient data with the distribution network 155. The distribution network 155 may comprise a distribution network facility having a processing apparatus, such as mail processing equipment, configured to scan or read unique identifiers located on items received into the distribution network facility. In some embodiments, the distribution network 155 may be a computer, a processor, or other similar device in communication with one or more processing apparatuses at distribution network facilities. The distribution network 155 can also include mobile computing devices configured to track resource position and item position, via, for example, a location detection system (GPS, etc.), and to scan items. the mobile computing devices can provide pick-up, location, and delivery data to components of the system 100

In the example of the USPS, the CPDB module 110 will ingest data from multiple sources to meet the ever-evolving analytics needs of USPS as described in the sections below. To meet these needs, CPDB can be a highly available and scalable system to provide on-demand access to various USPS data sources in a reliable and consistent fashion. Some of the systems that will feed the CPDB include: Informed Delivery (including MyUSPS), Assumed Change of Address, Informed Delivery Image Decomposition (IDID), Intelligent Addressing (IA), Product Tracking and Reporting (PTR), PostalOne! (PO!), Addressing Products (Delivery Point Barcode Exclusion List, Zone Information, End of Run), Failed First Attempt (FFA), and Redelivery. Table 1 below shows some of the data sources that will feed the CPDB:

TABLE 1

| System | System Description | Sample Data Attributes |
| --- | --- | --- |
| Informed Delivery (ID) | Allows users to digitally preview mail manage packages scheduled to arrive soon. | # Registered Users<br># Households<br>#Email Enabled Users<br>Open Rates<br>Click-to-Open Rates<br># Participating Mailers<br># Mailer Campaigns |
| Assumed Change of Address (ACOA) | Analyzes consumers' address history to determine whether someone has moved and did not report a Change of Address | Address Change Indicator (Rank 1-10)<br>Address Change Notice<br>Original ZIP11 |
| Informed Delivery Image Decomposition (IDID) | Analyzes postage/payment data on mail/packages to determine method of shipping payment | By/For Data<br>Full Imb |

TABLE 1-continued

| System | System Description | Sample Data Attributes |
| --- | --- | --- |
| Address Management System (AMS) | Maintains current data on each delivery point and provides that data to Postal Service facilities and customers | DPBC Exclusion List<br>ZIP to Area/District Mappings<br>ZIP to Delivery Points Mapping<br>ZIP to Site Mappings<br>Address Change Notice<br>Address Change Indicator<br>Address Change Type<br>ZIP11 Original<br>ZIP 11 Destination<br>Date of move |
| PostalOne! (PO!) | Offers a an electronic suite of services designed exclusively for business mailers | All IMbs from mail<br>All Delivery Point ZIP11s for mail<br>By/For Data<br>Mailing Dates<br>Expected In Home Dates |
| Product Tracking & Reporting (PTR) | Stores tracking scan data for all barcoded packages and extra services products | All IMPbs from packages<br>All Delivery Point ZIP11s for packages<br>By/For Data |
| Failed First Attempt (FFA) | Provides information on missed delivery on carrier's initial delivery attempt | Delivery Point ZIP11<br>IMPb<br>Reason for Failed Delivery<br>Date and Time of Delivery Attempt |
| Redelivery | Provides information on attempts to redelivery a package after a Failed First Attempt at a ZIP11 | Delivery Point ZIP11<br>IMPb<br>Date and Time of Redelivery |

The CPDB module 110 is configured to generate, receive, send, and track enhanced digital or supplemental content. This process will be described in greater detail below.

The content interface 125 is in communication, either wired or wirelessly, with the CPDB module 110 and the distribution network 155. The content interface 125 receives and communicates item data, content data, sender information, recipient information, and advertising campaign data with the CPDB module 110. The content interface 125 can receive the above information as from a content provider, such as an advertiser, shipper, sender, or other entity associated with an item to be delivered via the distribution network 155. The content data may comprise supplemental content, supplemental content item association, item association, budget, advertising impression targets, campaign duration, campaign start date, campaign end date, target audience demographics, and the like. Item association may comprise data associating one or more items with one or more campaigns, supplemental content pieces, recipients, recipient lists, and the like. The supplemental content may comprise a digital coupon, graphic, video, email, webpage, hyperlink, text message, instant message, social media message, augmented reality display, and the like. Audience demographics data may comprise age, height, weight, gender, socioeconomic status, geographic region, education level, credit score, personal interests, spending habits, and the like. User data may comprise user login credentials, physical addresses such as residential or business addresses, contact information such as phone numbers or email addresses, and the like.

The content interface 125 may reside on various platforms or devices such as a website, a mobile application, a dedicated terminal, or a computer. In some embodiments, the content interface 125 may comprise an application programming interface (API). The content interface 125 is configured to communicate content data and item data to eh CPDB 110 via the network 120.

The content interface 125 may be generated by the CPDB module 110 or by a third party, developer, user, or another entity desiring to access the system 100. In some embodiments, the CPDB module 110 allows an advertiser, a commercial user, a utility, financial institution, etc. user to generate a customized content interface 125, which can be made available to the user's customers via a website or mobile application owned or provided by the advertiser user. In this case, the CPDB module 110, in conjunction with provided APIs, may provide an advertiser user access to data from the CPDB module 110 for use on or in the advertiser user's own systems. Users of the content interface 125 may comprise advertising entities and their employees, associates, delegates, computer programs, and the like. The content interface 125 may comprise html form fields, data file import fields, and the like.

The distribution network user interface 135 is often in communication, either wired or wirelessly, with the CPDB module 110 and the distribution network 155. The distribution network user interface 135 may receive communicate item data and content data from the CPDB module 110, and can communicate the item data and the content data to the distribution network 155. The item data may comprise shipping notifications, delivery date estimations, weight, item type, volume, item contents, destination, recipient, item pictures such as external or internal views of an item, item size, or any other desired information relating to the item, and the like. The content data may comprise item association data, recipient data, budget, duration, campaign start date, campaign end date, and the like. Item association data may comprise data associating one or more items with one or more campaigns, recipients, recipient lists, and the like. Recipient data may comprise physical addresses such as a residence or business address, recipient names, recipient contact data such as a phone number or email address. Recipient data may further comprise recipient delivery preferences such as delivery location preferences, delivery time preferences, or whether the recipient rejected, accepted, or postponed the item delivery, and the like.

The distribution network user interface 135 may reside on various platforms or devices such as a website, a mobile application, a dedicated terminal, or a computer. In some embodiments, the distribution network user interface 135 may comprise an API.

The distribution network user interface 135 may be generated by the CPDB module 110 or by a third party, developer, user, or another entity desiring to access the system 100. In some embodiments, the CPDB module 110 may allow a distribution network 155 user to generate a customized user interface, which can be made available to the distribution network's customers via a website or mobile application owned or provided by the distribution network user. Users of the distribution network user interface 135 may comprise distribution network employees, associates, delegates, computer programs and the like.

The recipient user interface 115 is in communication, either wired or wireless, with the CPDB module 110 and the distribution network 155. The recipient user interface 115 may communicate recipient user data, item data, and supplemental content data with the CPDB module 110. Recipient user data may comprise user login credentials, physical addresses such as residential or business addresses, recipient names, and recipient contact data such as phone numbers or email addresses, and the like. Recipient user data may additionally comprise recipient delivery preferences such as desired delivery locations, desired delivery times, whether the recipient rejected, accepted, or postponed the item delivery, and the like. Recipient user data may further comprise supplemental content preferences such as topics of interest, supplemental content delivery preferences, and the like.

The item data may comprise shipping notifications, delivery date estimations, size, weight, type, volume, dimensions, contents, destination, recipient identification, recipient item preferences, item pictures such external or internal views of an item, or any other desired information relating to the item. Supplemental content may comprise a digital coupon, graphic, video, email, webpage, hyperlink, text message, instant message, social media message, text, and the like.

The recipient user interface 115 may reside on various platforms or devices such as a website, a mobile application, a dedicated terminal, or a computer. In some embodiments, the recipient user interface 115 may comprise an API.

The recipient user interface 115 may be generated by the CPDB module 110 or by a third party, developer, user, or another entity desiring to access the supplemental content system 100. In some embodiments, the CPDB module 110 may allow a recipient user to generate a customized user interface. In this case, the CPDB module 110, in conjunction with provided APIs, can allow a recipient user to access data from the CPDB module 110 for use on or in the recipient user's own systems. Users of the interface 115 may comprise item recipients, supplemental content recipients, and the like. In some embodiments, the user interface 115 can be an application or website, and can display mailpiece images and other information, such as in a dashboard format. In some embodiments, the user interface 115 can be an email inbox notification, with clickable images of the items to be delivered, where clicking the images provides access to supplemental content associated with the items being delivered.

The item sender user interface 140 is in communication, either wired or wirelessly, with the CPDB module 110 and the distribution network 155. The item sender user interface 140 communicates item data with the CPDB module 110. The item data may comprise shipping notifications, delivery date estimations, item pictures, item dimensions, item weight, item delivery address, and the like. Users of the item sender user interface 140 may comprise item senders and the like. In some embodiments, the item sender user interface 140 may be configured to allow an item sending user to associate physical distribution items with supplemental content provided via the content interface 125. In some embodiments, the item sender user interface 140 and the content interface 125 can comprise a single interface. This process will be explained in greater detail below.

The item sender user interface 140 may reside on various platforms or devices such as a website, a mobile application, a dedicated terminal, or a computer. In some embodiments, the item sender user interface 140 may comprise an API.

The item sender user interface 140 may be generated by the CPDB module 110 or by a third party, developer, user, or another entity desiring to access the supplemental content system 100. In some embodiments, the CPDB module 110 may allow an item sending user to generate a customized user interface, which can be made available to an item sending user's customers via a website or mobile application owned or provided by the item sending user. In this case, the CPDB module 110, in conjunction with provided APIs, can allow an item sending user to access data from the CPDB module 110 for use on or in the item sending user's own systems.

In some embodiments, the advertising data communicated by the content interface 125 with the CPDB module 110 may comprise internet address that references the storage location of the advertising data. For example, the advertising data may comprise an internet address referencing at least one image stored on a content delivery network. The referenced images may comprise an external view of the mail item being sent, such as the front and/or back of a mailpiece, an image of any portion or all of the parcel, flat, letter, etc., the contents of the mail item, or any other image that the advertiser wishes to associate with the mail item. The advertising data may additionally comprise one or more internet address referencing supplemental content that is associated with the mail item. The internet addresses may comprise uniform resource locators, internet protocol addresses, and the like. In this case, the CPDB module 110 can access and store the supplemental content referenced in the internet address using protocols such as file transfer protocol, hypertext transfer protocol, secure shell transfer protocol, secure file transfer protocol, and the like.

In some embodiments, the content interface 125 may send the advertising data to the CPDB module 110 using a DAT or XML file format. For example, in a postal service the data may be formatted as a mail.dat or mail.xml file.

In some embodiments, the CPDB module 110 can associate supplemental content with items sent by a third-party item sender. The supplemental content can be accessed by clicking on, tapping on, or otherwise selecting the image of an item. The supplemental content can reroute a user to a website, can apply a coupon or discount code for ordering products, can be an audio or video feature. In some embodiments, the supplemental content can provide an augmented reality experience, a virtual reality experience, can display a holographic message, sound, movie, and the like. The augmented reality and virtual reality content can be accessed using a mobile computing device or virtual reality hardware or devices.

As one example of supplemental content, a health food advertiser can create an advertising campaign that associates the health food advertiser's supplemental content, via the CPDB module 110, with a physical mail piece sent by a health food store, franchisor, franchisee, or other similar entity. After associating the supplemental content, the CPDB module 110 can then distribute the supplemental content to the item recipient. In this case, the distribution network 155 may provide compensation to the third-party item sender such as free shipping, discounted shipping, or a discount coupon in exchange for the supplemental content being associated with their item. Alternatively, the distribution network 155 may provide compensation to the item recipient in exchange for receiving and interacting with the supplemental content advertisement. In some embodiments, the health food advertiser may compensate the item sender or the item recipient in exchange for the supplemental content being associated with the item.

In some embodiments, the CPDB module 125 may generate a supplemental content recipient list and distribute supplemental content to that list without any item association. In this case, the CPDB module 110 can generate the supplemental content recipient list using data from past supplemental content recipient lists, email lists, instant message user lists, direct message user lists, social media user lists, and the like. Supplemental content recipients may receive a commission, discount coupons, or other form of compensation in exchange for receiving and interacting with the supplemental content.

In some embodiments, the content interface 125, and any other interface described herein, may additionally provide an advertiser user with configurable dashboards, reports, queries, and alerts. The content interface 125 may be configured to allow the advertiser user to analyze, manipulate, or trend data regarding the advertiser user's sent items, the advertiser user's supplemental content, and the advertiser user's advertising campaign settings, in whatever way the user wants. The content interface may allow customization of system preferences, including options to set delegation access in profile settings, manage subscriptions, navigate to other distributor, carrier, or shipper webpages, and view favorite queries and reports.

In some embodiments, the item sender or provider of supplemental content may change a campaign during the time of the campaign based on feedback or results obtained from the system 100. The item sender and the content provider may stagger the printing and the delivery of items based, at least in part, on campaign data communicated from the CPDB module 110 to the distribution network 155 via the distribution network user interface 135. For example, the health food advertiser may decide that they want to alter an advertising campaign in real-time, based on item feedback data from item recipients or supplemental content feedback data from supplemental content recipients. The advertising campaign alterations may include changes to the appearance of the print advertisement items, changes to the appearance of the supplemental content associated with print advertisement items, changes to the recipient lists for either the print advertisement items or the supplemental content, and the like.

The item feedback data may comprise user shipping preferences such as users rejecting delivery of the item, rejecting delivery of all items from the sender, changing the shipping address associated with the item, or rescheduling the delivery date of the item. The item feedback data may additionally comprise recipient conversion data received via the recipient user interface 115 or a third-party interface. For example, a print advertisement may include a discount coupon code specific to the advertising campaign that can be used to track the success of the campaign. When a recipient purchases the advertised product using the discount coupon code, the advertiser can communicate that recipient conversion data to the CPDB module 110 via one of the interfaces described above.

The recipient user interface 115 can display to a recipient, such as a registered recipient, images of mail pieces or items that are intended for delivery to a recipient on a certain day or within a certain time period. The distribution network 155 can provide data regarding items to be delivered on a day or within a time period to the CPDB 110. The CPDB 110 can identify which of the items to be delivered have supplemental or enhanced digital content associated with them. For items with which the CPDB 110 has supplemental content or enhanced digital content, images of those physical items are provided to the recipient user interface 115 for the specific recipient of the physical item or items. The recipient user interface 115 can provide these images in an email, via an application, a website, and the like.

The supplemental content feedback data may comprise time spent viewing the content, mouse clicks, mouse clicks that lead to a purchase of a product, mouse hovers, scrolling, tapping, dragging, sharing the content via social media, forwarding the supplemental content via email, forwarding the supplemental content via text message, forwarding the supplemental content via instant message, re-posting the supplemental content on a webpage, embedding the supplemental content on a webpage, and the like.

In some embodiments, the recipient user interface 115 may provide the recipient user with configurable dashboards, reports, queries, and alerts. The recipient user interface 115 may be configured to allow the recipient user to analyze, manipulate, or trend data regarding the recipient user's items and the recipient user's supplemental content, in whatever way the recipient user wants. The recipient user interface 115 may be configured to allow the recipient user to customize system preferences, including options to set delegation access in profile settings, manage subscriptions, navigate to other distributor, carrier, or shipper webpages, and view favorite queries and reports. In some embodiments, the recipient user interface 115 can provide additional functionality including buttons, links, or other features. For example, where the item is an advertisement, the additional functionality can be a button, link, or input which allows for easy, single click ordering of a product associated with the supplemental content or the item. If the item or mailpiece is a bill, such as a credit card or utility bill, the recipient user interface 115 can include a button or link for easy or quick paying of a bill, without the need to navigate to a separate website. Clicking the button may generate a pop-up menu for paying. In some embodiments, the recipient user interface 115 can provide additional functionality such as online voting, ordering/sending money orders, buying stamps and postage, or other functions.

In some embodiments, the recipient user interface 115 may enable a recipient user to choose various topical categories of personal interest such as hobbies, favorite movies, favorite books, favorite sports, and the like. In this case, the CPDB module 110 may use these topic choices to determine which items and supplemental content to send to the recipient user. For example, the recipient user may choose topical interests such as exercise, health food, and movies. The CPDB module 110, based in part on these recipient user choices, may then add this recipient user to various item mailing lists and supplemental distribution content lists, such as lists for gym membership advertisements, health food store advertisements, and movie theater advertisements. The recipient user interface 115 may be additionally configured to enable the recipient user to prevent item delivery and supplemental content delivery regarding certain topics or from a certain sender.

In some embodiments, the recipient user interface 115 will list items scheduled for delivery to the recipient user. In this case, the interface may list details associated with each item such as dimensions, weight, item sender, item category, pictures of the item, and the like. The CPDB module 110 may classify the items by category such as bills, personal correspondence, bank documents, advertisements, and the like.

In some embodiments, the recipient user interface 115 may enable the recipient user to select an option to accept, reject, or postpone the delivery of each item scheduled for delivery to the recipient user. The CPDB module 110 may store the recipient user's choice in a user preference database 310, and also communicate that choice with the distribution network 155. In some embodiments, the recipient user interface 115 can communicate the recipient user's item preference data directly to the distribution network 155.

In some embodiments, the recipient user interface 115 enables a recipient to reroute or redirect an item to an alternate delivery destination, to an electronic parcel locker, to a P.O. box or other desired destination. The recipient user interface 115 can be used to select a specific parcel locker location, bank of lockers, or a specific locker in a specific location. When the recipient goes to the parcel locker, the recipient can use a mobile computing device on which the recipient user interface 115 is being used to request opening of the locker. The mobile computing device can communicate with the locker and request the locker open in response to commands provided via the recipient user interface 115.

In some embodiments, the recipient user interface 115 allows a recipient to report that an item which was supposed to be delivered was not delivered, to report that items intended for another recipient or address were incorrectly delivered, and the like.

In some embodiments, the recipient user interface 115 allows a user to send a response to a received mail item. For example, if the item to be delivered, or which was delivered, is a birthday card, the recipient can, via a feature in the recipient user interface 115, initiate sending a response to the sender, including a personalized message, such as a thank you, etc., and the distribution network will automatically prepare and send the response. The recipient user interface 115 can generate a series of menus that the recipient can walkthrough to generate or create a response to send, which will then be sent by the distribution network.

In some embodiments, the recipient user interface 115 can include an option for a user to provide an electronic signature for receipt of an item, such as a parcel. Some items, such as high value items, require a signature from the recipient before the item can be left at the delivery address. When an image of such an item is received by the recipient in the recipient user interface 115, the recipient can select an electronic signature, indicating that a carrier or delivery entity can leave the item on the porch, in the garage, in the mailbox, or in another place which can be specified by the recipient. This can reduce the number of first delivery attempt failures, and can allow a recipient to receive delivery of an item even when the recipient is not able to be at the delivery address to sign for the item. The electronic signature can be tied to a login credential used to access the recipient user interface 115, the device on which the recipient user interface 115 is accessed, or it can have an input to receive an image of a signature. The signature can be compared to a previously obtained signature for the recipient, and can be stored for future use.

For example, a recipient user may decide that they do not want to receive items from a specific sender. Using the interface 115, the recipient user could reject each current item scheduled for delivery from that sender or reject all current and future items from that sender. After receiving the item rejection status data, the distribution network 155 can then return the item to the sender, deliver the item to another recipient, or destroy the item. Alternatively, a recipient user may decide to postpone the delivery of a package because of weather conditions or theft concerns. In this case, the recipient user may determine from the item dimensions or item picture that the item would not fit in the mail box. Because of the item size, the recipient user may be worried that the item may be exposed to bad weather or possible theft. Based on this information, the recipient user may decide to change the scheduled delivery date to a date when the recipient user is going to be present at the delivery location. The recipient user can communicate the new delivery date and address to the distribution network 155 via the recipient user interface 115. After receiving the updated delivery information, the distribution network 155 may hold on to the item until the new delivery date or divert the item to the new delivery address.

In some embodiments, the recipient user interface 115 may provide supplemental content which allows a user to automatically purchase an item and have the item shipped to an address on file in the user account. This can occur when a user clicks or taps on an image of a mailpiece, or on another portion of the image or of the recipient user interface 115.

In some embodiments, the CPDB module 110 may distribute supplemental content, to an item recipient, comprising a digital discount coupon in a text message. The item recipient may forward the text message to third parties such as friends, family members, or associates. These third parties can interact with the supplemental content using a third-party text message interface. These interactions may comprise clicking or tapping on the digital discount coupon to redeem it online, printing the discount coupon, saving the discount coupon, and the like. The third-party interface may then communicate the interaction data to the CPDB module 110 using an API, embedded content, a remote database connection, file transfer protocol, secure file transfer protocol, a secure shell connection, and the like.

In some embodiments, the CPDB module 110 may distribute supplemental content, to an item recipient, comprising a digital discount coupon in an instant message. The item recipient may forward the instant message to third parties such as friends, family members, or associates. These third parties can then interact with the supplemental content using a third party instant message interface. These interactions may comprise clicking or tapping on the discount coupon to redeem it online, printing the discount coupon, saving the discount coupon, and the like. The social media interface can then communicate the interaction data to the CPDB module 110 using an API, embedded content, a remote database connection, file transfer protocol, secure file transfer protocol, a secure shell connection, and the like.

In some embodiments, the CPDB module 110 may distribute supplemental content, to an item recipient, comprising a digital discount coupon in embedded content on a webpage. The item recipient may then forward the embedded content to third parties such as friends, family members, or associates. These third parties can then interact with the supplemental content using a third party internet browser. These interactions may comprise clicking or tapping on the discount coupon to redeem it online, printing the discount coupon, saving the discount coupon, and the like. The internet browsing interface can then communicate the interaction data to the CPDB module 110 using an API, embedded content, a remote database connection, file transfer protocol, secure file transfer protocol, a secure shell connection, and the like.

In one example, the health food advertiser provides the content interface 125 with advertising data relating to a new organic egg advertising campaign. After receiving the data, the CPDB module 110 generates a recipient list based on audience demographic data selections and campaign data received from the content interface 125 input by the health food advertiser. The health food advertiser may also choose to associate with the campaign one or more mail item or mail item types for delivery by the distribution network. The recipients may be chosen based on recipient or preference information stored in the CPDB 110. To illustrate, the CPDB may select to send the supplemental content to recipients who have previously purchased items from the health store or other similar health stores, people who subscribe to magazines related to food or organic food, high-income recipients, who live within a geographical area from the health store, people who buy running shoes, or any other desired recipient information.

In this case, the health food advertiser entered into the user interface 125 audience demographic data selections consisting of recipients who live in the city of San Diego, have indicated a previous interest in the topics of exercise and health food, and have a purchase history of buying organic food products. The content interface 125 allows the health food advertiser in this example to select these categories through a variety of options such as dropdowns menus, check boxes, radio buttons, text fields, text areas, auto-fill text fields, and the like. The health food advertiser may choose to limit the total number of recipients in this group to a set number or to a percentage of the total available recipients matching the demographic data. In addition to demographic data, the health food advertiser can associate supplemental content with the campaign via the content interface 125. The supplemental content in this example may comprise a hyperlink to a digital discount coupon for discounted organic eggs.

After receiving the campaign data, the CPDB module 110 will associate the supplemental content with the item recipient list and distribute the supplemental content to the recipients in the recipient list. Each item recipient in this example will receive an email or text message notification regarding the shipped item. The notification will include the supplemental content hyperlink. The supplemental content may additionally comprise an image or text describing the discount offer. The recipient can interact with the notification using an email or text message interface. If the recipient clicks or taps on the discount coupon hyperlink, the health food advertiser will be charged for the interaction. In some embodiments, the health food advertiser may pay for each 1000 impressions of their supplemental content. In some embodiments, the health food advertiser may pay for each time a recipient redeems the coupon by purchasing organic eggs.

In some embodiments, the campaign data changes may be made by the health food advertiser after each round of supplemental content distribution via the content interface 125 or by a third-party user interface. For example, the health food advertiser may configure their organic egg advertisement campaign to stagger distribution. After each round of distribution, the CPDB module 110 will pause the campaign and notify the health food advertiser regarding the campaign status. The health food advertiser can then view, using the advertising user interface 125, statistics regarding recipient interaction with the most recent group of distributed supplemental content. In this example the advertiser may notice that their supplemental content campaign has a fifty percent higher click rate with middle-aged recipients. The health food advertiser can then alter their campaign list to exclusively target middle aged-recipients. After finalizing the campaign changes, the health food advertiser will then un-pause the campaign, and the CPDB module 110 will begin distributing another round of supplemental content. In some embodiments, the campaign data changes from this example may be made automatically by the CPDB module 110 and then approved by the advertiser user via the content interface 125 or by a third-party user interface.

The potential users of the supplemental content system are not limited to health food advertisers. For example, a national advertiser such as a department store chain may decide to promote a holiday sale via the supplemental content system. In another example, an online streaming music service may utilize the system to generate more users through a supplemental content advertising campaign offering a free week of streaming music in exchange for filling out an online contact form. In yet another example, a local government agency could utilize the supplemental content system to spread a public service announcement regarding the importance of conserving water during a drought. In this example, the supplemental content could be associated with mail items such water bills or lawn care supplies. The supplemental content can be accessed by clicking or tapping on the image of the water bill displayed in the recipient user interface 115.

FIG. 2A is a flowchart depicting a process 200 for managing supplemental content. The process 200 begins in step 205, where the CPDB module 110 associates supplemental content, such as advertising campaign data, with an item, or with a plurality of similar items intended to be sent via a distribution network, such as the USPS. The provider of supplemental content can provide an example, such as a digital version of a physical item with which the supplemental content will be associated. In some embodiments, the provider of supplemental content can include an identifier, such as a computer readable identifier, to the CPDB 110 which will be associated with the supplemental content. When the distribution network scans the identifier, the processing equipment of the distribution network 155 will identify, or the CPDB 110 will identify or recognize the identifier and retrieve or access the associated supplemental content. Step 205 comprises generating an advertising campaign 206, generating an item address distribution list 208, and generating supplemental content 209, as will be described greater detail below with reference to FIG. 2B.

The process 200 moves to step 210, wherein the distribution network receives the item. In a distribution network, such as a postal system, items may comprise mail pieces such as letters, flats, packages, or other mailed items. It should also be noted that in some embodiments, step 205 may be performed after step 210. The physical item can be received from the provider of supplemental content, or from another party who prepares the content. The physical item can have the unique identifier thereon which is associated with the supplemental content.

The process 200 next moves to step 215, wherein item scan information is received. Item scan information can be received from a mobile scanner, a handheld scanner, item processing equipment, a full service handheld scanner, from the transportation system, and the like, upon scanning the physical item within the distribution network 155. The scan information includes a computer readable code encoding the identifier, which is attached to or associated with the item, information regarding the device or equipment which performed the scan, including device/equipment type and location, and a handling event type. The scan information may also include one or more images of the item. The scan information is received by system 100 via one of the interfaces described above.

The process 200 next moves to step 220, wherein the CPDB module 110 stores the scan information, and accesses supplemental or enhanced digital content associated with the scan information, including the scanned identifier.

After the scan information is stored, the process 200 next moves to step 225, wherein the CPDB module 110 communicates the item data, including images of the item, and supplemental content to the recipient user interface 115. The CPDB module 110 may additionally send item data and supplemental content to a recipient via third party interfaces using email, text messages, social media, instant messages, internet advertisements, phone applications, website browsers, and the like. In some embodiments, it is desirable to only send the supplemental content, item data, and images of the item to the recipient user interface 115, such as the hybrid digital mailbox associated with a user and/or a user's account, when the item is out for delivery, or is intended for delivery within a certain time period, such the current day, the next day, within 24 hours, or any other desired period. The scan information provided to and stored in the CPDB module 110 can include an identifier or an indication of the location of the scan, the type of equipment providing the scan, and the like. The CPDB module 110 can use the identifier or identification of the scanning equipment to determine what stage in the distribution network the item is in. The CPDB module 110 can receive the item's induction scan and identify associated supplemental content for the item, but may not provide the supplemental content or item information to the recipient user interface 115 upon the induction scan. When the scan information comes from a digital barcode scanner, or other type of sorting equipment, or a last-mile scan, or a scan at a local unit delivery facility is received, the CPDB module 110 can determine that the item is out for delivery, or scheduled for delivery within the desired time period. When the item is going to be delivered within the time period, or is out for delivery, the CPDB 110 can send the supplemental content, item information, and the like to the recipient user interface 115.

The process 200 next moves to decision state 240, wherein the item recipient accepts or rejects an item scheduled to be delivered to the recipient. The recipient can accept or reject the item which is out for delivery or intended for delivery within the desired time period via the recipient user interface 115. In some embodiments, the recipient can request to reroute the item to another location, request a hold be placed on delivery, or report incorrect delivery. Alternatively, the recipient may accept or reject the item via a third party interface using mediums of communication such as emails, text messages, social media, instant messages, internet advertisements, phone applications, website browsers, and the like. The recipient user interface 115 presents the recipient with item data comprising delivery date and time, item dimensions, item pictures, item sender information, and the like. The recipient can use this information to determine whether to accept or reject the item by selecting the appropriate option in the recipient user interface 115. Once the recipient accepts or rejects the item, the CPDB module 110 will store the recipient preference. In some embodiments, the recipient may have preset preferences for receipt of items, such as an automatic rejection of all items from a certain sender or on a certain topic, or an automatic permission for all items from a certain sender (a "safe" sender), or a periodicity for delivery of certain types of items. For example, a recipient may desire to receive unsolicited physical mail, such as advertisements, once a week, on a certain day, or at any other desired periodicity. A recipient may desire that all parcels or packages are delivered to an alternate location, such as a parcel locker or P.O. box, are placed on the front porch, behind a plant, etc. A recipient may wish to have utility or other bills all arrive on a certain day of the week. In such situations, when an item is scanned, the CPDB module 110 will access the preferences for the recipient, and can route the item or provide item delivery instructions accordingly.

The CPDB module 110 will then communicate the recipient user preference to the distribution network 155. If the item is accepted or the recipient does not make a selection, the process moves to step 250, and the distribution network 155 will deliver the item. If the recipient chooses to reject, reroute, postpone delivery, or provide another option for the item, the process moves to step 230, wherein the distribution network 155 will prevent the rejected item being delivered to the recipient, or will route the item according to instructions or preferences. In the case the item is rejected, the distribution network 155 may return the item to sender, dispose of the item, recycle the item, or send the item to a new recipient based on campaign settings created in step 205. In some embodiments, the recipient may accept the item by failing to explicitly accept or reject the item within a set amount of time.

The process 200 next moves to step 255, wherein an interface captures a recipient user's interaction with supplemental content. Step 255 may comprise a recipient user interacting with the supplemental content via the recipient user interface 115 or a third party interface such as an internet browser, a phone application, a computer program, and the like. The interaction data may comprise mouse movements, mouse clicks, stylus movements, stylus clicks, touch screen interaction, eye tracking, motion tracking, voice commands, and the like. In some embodiments, a secondary recipient of the supplemental content may interact with the supplemental content 257. For example, the original supplemental content recipient may decide to share a hyperlink to the supplemental content, on a social media platform. In this case, the users of the social media platform can then open the hyperlink and interact with the supplemental content. These secondary recipients of the supplemental content can then re-share the supplemental content with other users of the social media platform. Each interaction with the supplemental content can be recorded and can include a unique identifier for the content and interaction which can be associated with the physical item, or with the digital representation of the item in the recipient user interface 115, in order to track the interactions from a specific user, or for a specific item in the recipient user interface 115.

The process 200 next moves to step 260, wherein the CPDB module 110 reviews the supplemental content interaction data generated in step 255. This step will be described in greater detail below.

The process 200 next moves to step 280, wherein the CPDB 110 determines whether all or a substantial portion of the items associated with the campaign or supplemental content have been delivered to the intended recipients. If all items have been delivered, then the process ends. If there are additional items to be delivered, the process continues to step 205. The CPDB module 110 can then apply any campaign changes, from step 260, in step 205.

Figure 2C:
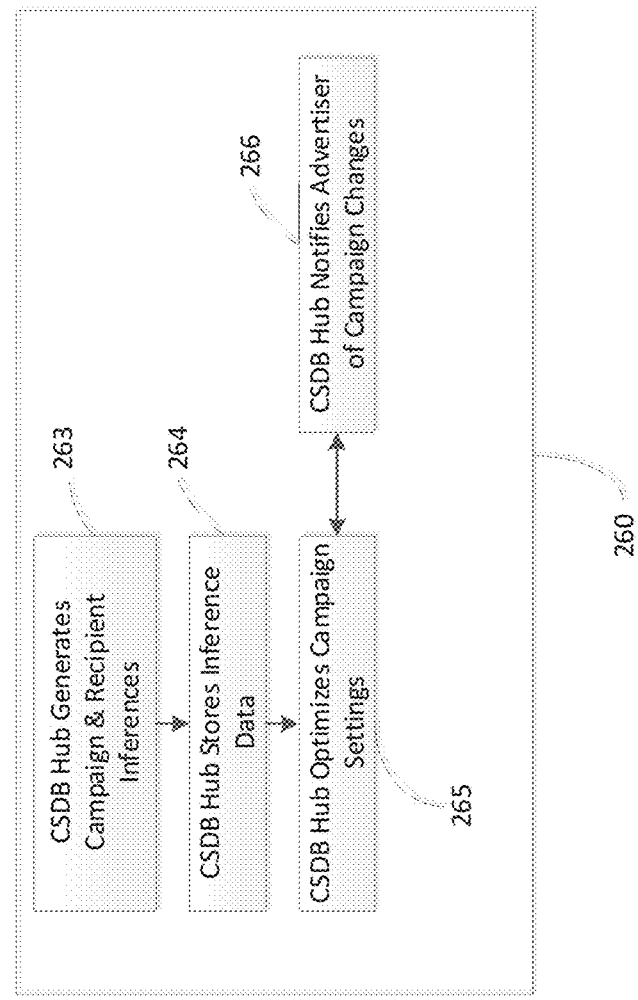
FIG. 2C is a data flow diagram of step 260 from FIG. 2A.
Figure 2B:
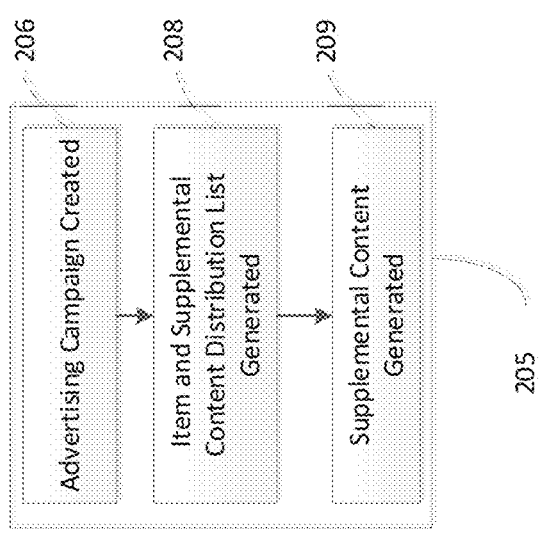
FIG. 2B is a data flow diagram of step 205 from FIG. 2A.

FIG. 2B depicts an embodiment of step 205. Step 205 begins with sub-step 206, wherein the a sender, shipper, mailer, advertiser, or other party provides the supplemental content, campaign data, item information, distribution lists, parameters for identifying potential recipients, target markets, payments, and the like to the content interface 125, which, in turn, stores all the information in the CPDB module 110 and associates the information with the physical mail items to be delivered. In some embodiments, the supplemental or digital content, such as advertising campaign data may be generated, formatted, altered, etc., by the CPDB module 110. For example, the CPDB module 110 can set the campaign duration, alter the campaign budget, or generate supplemental content for the campaign using one or more supplemental content layout templates.

The process 200, in step 205, moves to sub-step 208, wherein the content interface 125 provides the CPDB module 110 with the item distribution lists and supplemental content distribution lists. The item and supplemental content distribution lists can comprise item and supplemental content recipient information such as names, physical addresses, email addresses, social media user names, instant message user names, phone numbers, intelligent addresses, and the like. In some embodiments, the sender, advertiser, or the like provides a code to associate with the supplemental content, or receives a code from the distribution network 155 via the network 120 that is or will be on the physical item, and the code is stored. The code is associated with supplemental content provided by the advertiser or the item sender. When the item is scanned or processed on sorting or distribution equipment, such as mail processing equipment, an image of the item is obtained, and the code thereon can be deciphered. The code is compared to stored codes. If a match is identified between a deciphered code and a stored code, the supplemental content associated with the stored code is associated with the image of the item. When the recipient interacts with the image of the item, the associated supplemental content is provided.

The process 200 next moves to step 209, wherein the CPDB module 110 associates supplemental content with the advertising campaign 206. An advertiser user can provide the supplemental content 209 to the CPDB module 110 via the content interface 125.

In an alternative embodiment, the CPDB module 110 may generate or alter the supplemental content. In this case, an advertiser user can edit and approve the CPDB module's supplemental content changes via the content interface 125.

It should be noted that in some embodiments, step 208 may be performed after step 209. Additionally, process 200 is described here with regard to one or a few items, or one or a few pieces of supplemental content, and as one process. However, in the case of a distribution network, such as USPS, process 200 may be occurring many times in parallel, or may be occurring many times with different steps of process 200 occurring for different items or different pieces of supplemental content, at the same time.

FIG. 2C depicts one embodiment of step 260. Step 260 comprises sub-step 263, wherein the CPDB module 110 receives the interaction data from steps 255 and 257 and the CPDB module 110 generating campaign inferences and recipient inferences 263.

In sub-step 264, The CPDB module 110 stores the inferences 264, and the CPDB module 110 optimizes campaign settings based on the inferences 264. The CPDB module 110 may optimize the campaign settings in step 265 by, but not limited to, customizing in real-time unviewed supplemental content to the recipient, customizing supplemental content to the recipient for future distribution, removing the recipient from the recipient list, adding the recipient to additional recipient lists, customizing the item to the recipient, ending the campaign, pausing the campaign, creating a new campaign, and the like.

In sub-step 266, the CPDB module 110 notifies the advertiser user of the changes 266 via the content interface 125 or the item sender user interface 140. The CPDB module 110 generated inferences will be described in greater detail below with reference to FIG. 3. The CPDB module 110 will then notify the advertiser user of any campaign changes 266. In some embodiments, the CPDB may require the advertiser user to approve the campaign changes using the interface 125.

Figure 3:
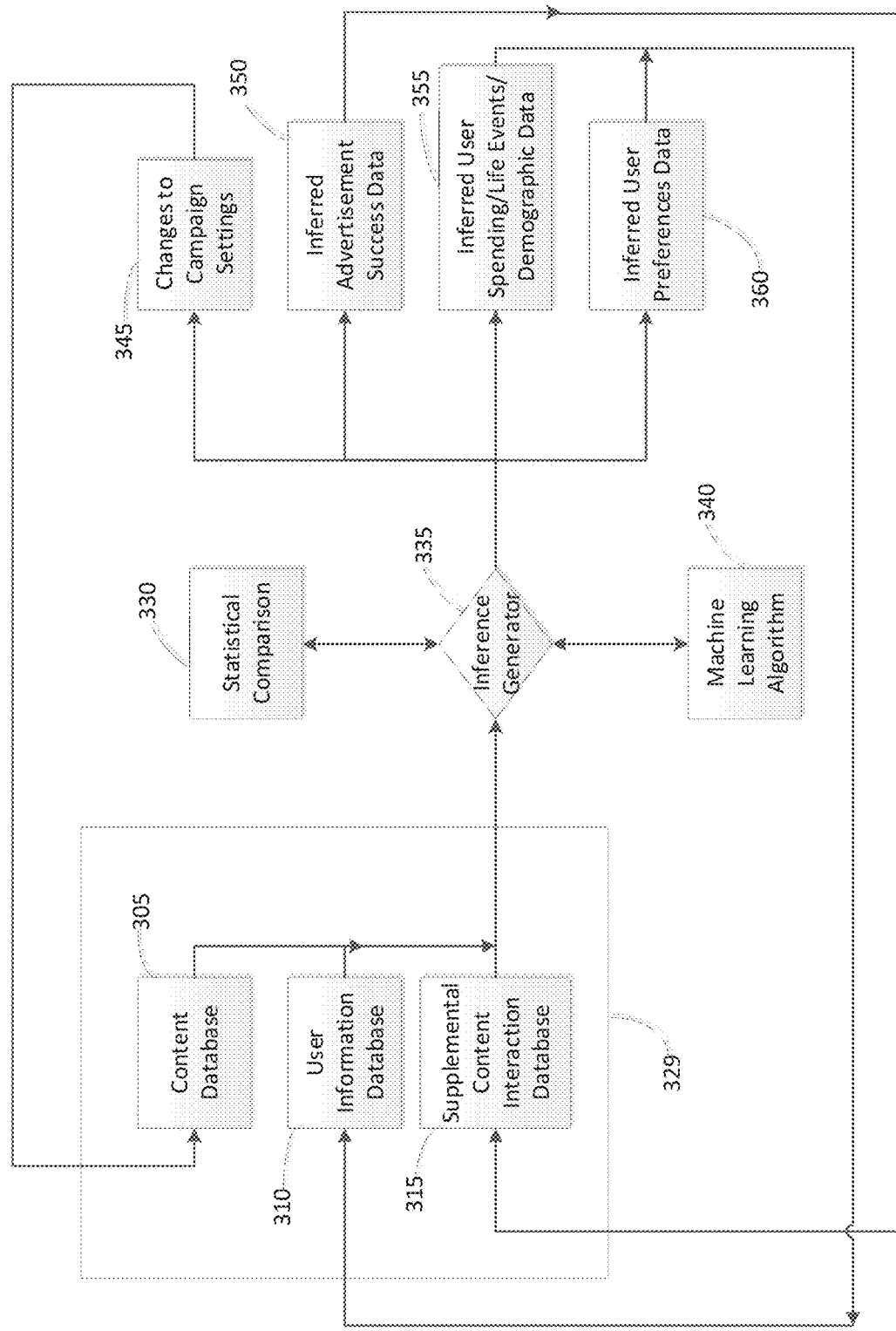
FIG. 3 illustrates conceptual layers of data flow of an example embodiment of the CPDB module.
Figure 4:
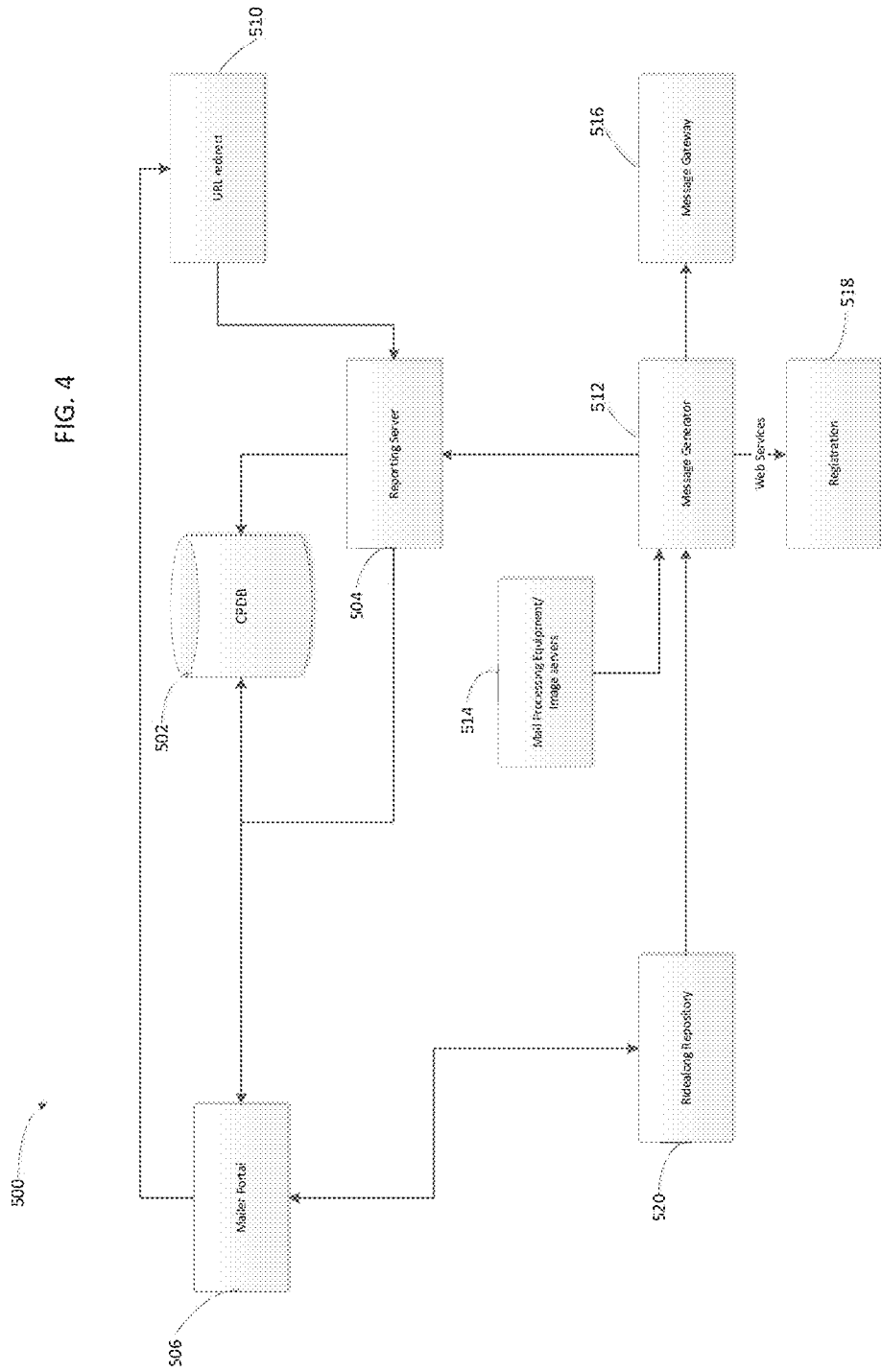
FIG. 4 depicts an embodiment of block diagram and data flows for a supplemental content system.

FIG. 3 depicts an embodiment of data flow between a variety of systems, subsystems, or modules used in the tracking and gathering of data for use by the CPDB module 110. The inputs depicted in input module 329 provide data to an inference generator 335 which enables the inference generator 335 to provide the functionality, features, and services described herein.

Input module 329 comprises one or more of the following data sources: an advertising database 305, a user information database 310, and a supplemental content interaction database 315. In some embodiments, input module 329 may comprise a processor, memory, databases, address and control lines, and other components. In other embodiments, 329 may be configured to use the processor, memory, databases, address and control lines, and other components of the CPDB module 110. It is to be understood that the term database is not limited to a component that only stores data but, in some embodiments, the databases described herein can also be used to manipulate data, edit data, generate new data, and other functions. Databases can store information in multiple file formats, arrangements, tables, etc. Databases herein may have dedicated or shared processors or memory. In some embodiments, the inference generator 335 may receive input from additional data sources not listed in FIG. 3.

The advertising database 305 receives input data from one or more of the user interfaces described above. The data can include supplemental content, budgets, impression targets, campaign duration, campaign start date, campaign end date, cost-per-click allowance, target recipient demographics, item associations, and the like.

The user information database 310 receives input data from one or more of the user interfaces described above. The data comprises physical characteristics such as age, gender, height, weight, and the like; personal characteristics such as birthdate, address, relationship status, family member details, employment status, and the like; contact information such as phone numbers, home address, work address, email addresses, social media usernames, instant message usernames, and the like. The user information database 310 can use criteria provided in the content interface 125 when a campaign is created, and the criteria can be selected by the advertiser, shipper, and the like.

In some embodiments, the user information database 310 receives inferred user metric data and inferred user preference data from the inference generator 335. The inference generator comprises one or more algorithms that use statistical comparison, machine learning, and the like to locate patterns in both the item data and the user data stored in the CPDB module 110. This process is described in greater detail below.

In some embodiments, the user information database 310 receives user metric data from third party data sources. The third party data sources communicate the data to the CPDB module 110 by way of an API, embedded content, a remote database connection, file transfer protocol, secure file transfer protocol, a secure shell connection, and the like. This data comprises physical characteristics such as age, gender, race, height, weight, and the like; personal characteristics such as birthdate, address, relationship status, family member details, employment status, and the like; contact information such as phone numbers, home address, work address, email addresses, social media usernames, instant message usernames, and the like; personal interest information such as hobbies, favorite movies, favorite books, topics of interest, favorite sports, dislikes, and the like; financial information such as income levels, bank account data, real estate ownership, credit rating, car ownership, and the like; internet use data such as internet search history, social media use history, and digital advertisement interaction data, and the like; purchase data such as grocery store purchases, retail purchases, online purchases, and the like.

The supplemental content database 315 receives input data from one or more of the user interfaces described above. The data can include a digital discount coupon, graphics, video, email, webpage, hyperlink, text message, instant message, social media message, virtual or augmented reality content, and the like. The data may further comprise user interactions with supplemental content such as time spent viewing the content, mouse clicks, mouse hovers, scrolling, tapping, dragging, sharing the content via social media, forwarding the content via email, forwarding the content via text message, forwarding the content via instant message, re-posting the content on a webpage, embedding the content on a webpage, and the like.

In some embodiments, the supplemental content database 315 may receive supplemental content data from a third party data source by way of an API, embedded content, a remote database connection, file transfer protocol, secure file transfer protocol, a secure shell connection, and the like. In one embodiment, the CPDB module 110 email an item recipient supplemental content comprising a digital discount coupon. To illustrate, an item recipient, such as a mail recipient in the postal service, may receive a notification from the CPDB module 110 via an email, instant message, text message, social media message, and the like. In this case, the notification may comprise information about an item scheduled for delivery and a piece of supplemental content associated with the item. The supplemental content may comprise a digital coupon, graphic, video, email, webpage, hyperlink, text message, instant message, social media message, text, and the like. The recipient user's interactions with the supplemental content may be recorded by the third party user interface, communicated to the CPDB module 110, and then stored by the CPDB module 110 in the supplemental content interaction database 315.

The inference generator 335 receives data from the input module 329. The inference generator 335 analyzes the data from input module 329 by searching for patterns in the data. In some embodiments, the inference generator 335 may use statistical comparison algorithms 330, machine learning algorithms 340, and the like to locate patterns in the data from 329. The located patterns can comprise a recipient user's spending habits, which types of supplemental content have high conversion rates, which types of items have a high rejection rate, and the like. After locating the patterns, the inference generator 335 uses the patterns to generate inferences relating to advertising campaign success 350, recipient user metrics 355, recipient user preferences 360, and the like. Inferences can comprise a recipient user's gender, a recipient user's age, a recipient user's interest level in certain types of product, and the like. For example, the inference generator 335 may determine that recipients matching a particular demographic display higher click-through rates or spend more time viewing or interacting with supplemental content than other demographics. In some embodiments, the inference generator 335 may determine that a particular feature of the supplemental content generates more views, traffic, clicks, time spent viewing, and the like. These inferences are exemplary only, and a person of skill in the art, guided by this disclosure, will understand how other inferences can be made using the data received from the recipient user interface 115 and/or the distribution network 155.

In some embodiments, the machine learning algorithms 340 can also be utilized for mail image recognition. This would be utilized in order to determine whether there was a pattern between the images presented on a mailpiece, and the user's interaction with a mailpiece. For example, if a user were to interact more favorably with some images than others, that would allow for personalized tailoring of mail campaigns. For example, those who tend to respond better to mail campaigns with pictures of cats would get a mailing with cat pictures, and those who preferred dogs would get dog pictures. This can result in highly personalized supplemental content. Additionally, in some embodiments, the machine learning algorithms 340 could be utilized in order to do anonymized analysis. This may include determining how a user interacts with mail, and provide recommendations. This recommendation engine could be utilized in a way that can analyze patterns in user behavior, group that behavior in aggregate, and then provide recommendations. For example, if a user were to repeatedly interact with a particular outdoors provider, the recommendation engine could provide the option to receive additional mail from similar providers.

After generating the inferences, the CPDB module 110 may alter campaign settings based on the inferences, such as sending item to a certain demographic more frequently or as a higher percentage of all recipients, or by altering features of the supplemental content which have generated more click-throughs. The campaign changes 345 are stored in the content database 305. The CPDB module 110 may also store inferred advertisement success data 350 in the supplemental content database 315, inferred recipient user metric data 355 in the user information database 310, and inferred recipient user preference data in the user information database 310.

The inference generator 335 also provide inferences for recipients based on previously stored recipient information. For example, the inference generator 335 may generate an inference that a mail recipient recently became a parent, had a birthday, got married, graduated, bought a car, bought a house, planned a vacation, or the like. In the case of becoming a parent, the mail recipient made multiple social media posts about babies and purchased multiple baby products over a couple month time period. In generating the inference, the CPDB module 110 first stores this data in the input module 329. Next, the inference generator 335 queries the data, finds patterns in the data, and generates the inference that the mail recipient is a new parent based off the data patterns. After generating the inference, the CPDB module 110 will then store the new mail recipient demographic data in the user information database 310. The inferred user spending/life events/demographic data generated by the inference generator 335 can be sent to the user information database 310 and can be stored. User preference data 360 inferred by the inference generator 335 based on interactions with supplemental content can also be stored in the user information database 310. Stored user spending/life event/demographic data 355 and user preferences data 360 in the user information database 310 can be used when advertising campaigns, distribution lists, and the like are received and prepared in the future.

In some embodiments, CPDB module 110 can use inference data from blocks 350, 355, and 360 to generate additional inferences regarding how a recipient may interact with items and supplemental content. In some embodiments, the CPDB module 110 may use inference data to custom tailor content to a recipient before sending the item or the supplemental content to that recipient. In some embodiments, the CPDB module 110 can use inference data to custom tailor unviewed supplemental content sent to a recipient. For example, the CPDB module 110 may send supplemental content to a recipient comprising a text message with a hyperlink to a webpage. After sending the text message but before the recipient opens the link, the CPDB module 110 may determine that the recipient tends to interact with supplemental content for longer time periods when the content uses a blue background. The CPDB module 110 may then alter the webpage so that background color displays as blue for that recipient. The webpage background color would remain the original color for other recipients.

In some embodiments, the CPDB module 110 can use inference data to alter advertising campaign item distribution lists and supplemental content recipient lists stored in the advertising database 305. In this case, the CPDB 110 module can add a recipient to distribution lists that match an advertiser or sender's requested or target demographic data and remove the recipient from distribution lists that do not match.

For example, the CPDB 110 module could remove a recipient from an advertising campaign targeting people who purchase sports cars. In this example the CPDB module 110 determined that the recipient's demographic data is strongly correlated with people who buy automobiles with above average storage space. After making this inference, the CPDB module 110 would then remove the recipient from the sports car advertisement campaign list and add that recipient to a mailing list targeting potential minivan and sports utility vehicle purchasers. After updating these lists, the CPDB module 110 will communicate these changes to the distribution network 155. The distribution network 155 can hold or return to the sender any items that are scheduled to be delivered to the recipient based on the list that the recipient was removed from. Additionally, the distribution network 155 will send items to the recipient based on the new list that they were added to. In this case, either the sender would provide the distribution network with additional items for the new recipient, the distribution network would have access to surplus items to send to the new recipient, similar to a fulfillment center, or the distribution network would generate new items for the new recipient, such as printing out additional mailer advertisements.

FIGS. 5A and 5B depict data flows for campaign management system 500. This diagram is exemplary, and can provide additional details about the components that make us the CPDB module 102 described herein. A person of skill in the art will understand, however, that the CPDB module 102 can include on or more, or a subset of the components shown in the campaign management system 500, and that there may be some overlap between the detailed campaign management system 500 components and components described elsewhere herein.

The campaign management system 500 includes a CPDB 502. The CPDB 502 is the master repository of aggregated customer behavior, preferences, patterns, and the like, and can be similar to those described elsewhere herein. The CPDB is in communication with a reporting server 504 and a mailer portal 506. The reporting server 504 aggregates data from the various parts of the campaign management system 500 and provides data to both the distribution network systems and the customers. The mailer portal 506 provides reports and dashboards for participating mailers, such as advertisers, shippers, item senders, and the like. Mailers can see the status of their campaigns, view analytical data, control parameters about content, approve content changes, and interact with all other portions. The mailer portal 506 can be similar to interfaces described elsewhere herein.

The reporting server 504 is in communication with a URL redirect module 510. The URL redirect module 510 provides a gateway for click-throughs. As recipients click links, or otherwise interact with supplemental content in the recipient user interface, the links arrive at the URL redirect module. The clicks and interactions with the supplemental content are received at the URL redirect module 510 to be counted and mailers, senders, advertisers, and the like can be charged before the recipients of the mailpiece are forward to their intended destination.

The reporting server 504 is also in communication with a message generator 512. The message generator 512 is a central location where messages for subscribers, recipients, etc. can be generated regardless of the end delivery format, e.g., email, text, voicemail, video, graphics, and the like. The message generator 512 receives mail images, supplemental content (ride-along content), subscriber lists, and business rules to generate content to be pushed through the appropriate messaging channel.

The message generator 512 can receive mail images from mail processing equipment 514. The mail processing equipment 514 can have wide field of view cameras that image items being processed. The captured images can be routed through mail image capture servers at local plants which are aggregated and sent to a central image server in communication with the message generator 512.

The message generator 512 receives supplemental content, such as ride-along content from a supplemental content repository 520. The supplemental content repository 520 receives supplemental content from the advertise, mailer, sender, and the like, and provides the association with the physical mailpieces described elsewhere herein via the mailer portal 506. The supplemental content can include all of the digital assets that have been uploaded by mailers, senders, advertisers, etc., for inclusion with notifications, described herein.

The message generator 512 can generate XML messages to send to a message gateway 516. The message gateway 516 includes an email formatter to convert XML data into email to be sent to recipients. The message gateway 516 also includes a formatter to receive XML data from the message generator 512 to display in web pages, mobile devices, applications, and for any other format.

The message generator 512 is also in communication with a registration module 518. The registration module provides a recipient or customer an ability to register with the system 500 to receive notifications, messages, and supplemental content described herein.

The mailer portal 506 is in communication with the reporting server 504, from which it can obtain information regarding campaign status, messaging, and other statistics described herein. The mailer portal 506 is in communication with the CPDB 502, allowing a mailer to provide campaign data, requests, and the like to the CPDB 502 for use in notifications and messages provided by the message generator 512. The mailer portal 506 is additionally in communication with the URL redirect module 510, which enables the mailer to see how many links were clicked and by whom. This also allows the mailer to set the final destination for a link when a user clicks on a supplemental content link in the notification.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The central hub 120 may comprise a processor such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-Series®, or FX® processor, or the like. The processor 111 typically has conventional address lines, conventional data lines, and one or more conventional control lines.

The system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for handling distribution items comprising:

a mail sorting apparatus comprising a camera, the mail sorting apparatus configured to:
- capture, by the camera, an image of a physical distribution item having an identifier thereon;
- interpret the identifier from the captured image of the physical distribution item, the identifier including a delivery point and a code; and
- sort the physical distribution item according to the delivery point;

an item image processor configured to store the captured image of the physical distribution item, to generate identifier information from the captured image of the identifier, and to associate the identifier information with the stored captured image;

a supplemental item content interface in communication with a supplemental item content processor, the supplemental item content processor configured to:
- receive, from a sender of the physical distribution item, the identifier which is on the physical distribution item;
- receive a plurality of types of supplemental item content, wherein each of the plurality of types of supplemental item content is associated with a different geographic area;
- associate each of the plurality of types of supplemental item content with the identifier on the physical distribution item; and a central hub in communication with the item image processor, the mail sorting apparatus, and the supplemental item content processor, the central hub configured to:
- receive the identifier information from the mail sorting apparatus;
- identify, based on the delivery point, a geographic area to which the physical distribution item into be delivered;
- determine, based on the identifier information, and the geographic area, one of the plurality of types of supplemental item content associated with the identified geographic area;
- select, from the determined plurality of types of supplemental item content, one of the types of the plurality of types of supplemental item content that is associated with the identified geographic area;
- provide to an intended recipient of the physical distribution item a delivery notification including the stored image of the physical distribution item;
- cause the mail sorting apparatus to sort the physical distribution item according to the identified delivery point; and
- based on causing the mail sorting apparatus to sort the physical distribution item, provide, to the intended recipient, via a user interface, the selected one of the types of the plurality of supplemental item content with the delivery notification.

2. The system of claim 1, wherein the selected supplemental item content is embedded in the image of the physical distribution item provided to the intended recipient.

3. The system of claim 1, wherein the central hub is configured to provide the stored image by sending an electronic message mail including the stored image to the intended recipient.

4. The system of claim 1, wherein the delivery notification further comprises an electronic interface accessible by the intended recipient, the electronic interface configured to provide an option to accept or reject delivery of the physical distribution item.

5. The system of claim 3, wherein the intended recipient accesses the selected one of the types of the plurality of supplemental item content by selecting the received stored image received in a dashboard of the user interface.

6. The system of claim 1, wherein the central hub is further configured to receive, from the intended recipient, interaction information regarding the recipient's interaction with the supplemental item content, and wherein the supplemental item content interface is configured to receive the interaction information and to provide the interaction information to the sender of the physical distribution item.

7. The system of claim 1, further comprising a customer preference database, the customer preference database storing preference data for a plurality of customers.

8. The system of claim 7, wherein the supplemental item content interface is configured to receive a request for a distribution list of recipients and a list of preference parameters.

9. The system of claim 8, wherein the customer preference database is configured to generate a distribution list of a plurality of recipients based on the list of preference parameters, and to generate a unique identifier for each of the plurality of recipients.

10. The system of claim 1, wherein the central hub is configured to track delivery data for the physical distribution item and to provide the selected one of the types of the plurality of supplemental item content when the received identifier information is associated with supplemental item content in the supplemental item content interface.

* * * * *